(12) United States Patent
Lovelace et al.

(10) Patent No.: US 11,204,967 B2
(45) Date of Patent: Dec. 21, 2021

(54) COMPUTER SYSTEM TRANSACTION PROCESSING

(71) Applicant: Gunnar Lovelace, San Francisco, CA (US)

(72) Inventors: Gunnar Lovelace, Santa Monica, CA (US); Poornaprajna Udupi, Burlingame, CA (US); Duke Alan Jones, Kensington, CA (US)

(73) Assignee: Gunnar Lovelace, San Francisco, CA (US)

( * ) Notice: Subject to any disclaimer, the term of this patent is extended or adjusted under 35 U.S.C. 154(b) by 46 days.

(21) Appl. No.: 16/653,260

(22) Filed: Oct. 15, 2019

(65) Prior Publication Data

US 2020/0097508 A1 Mar. 26, 2020

Related U.S. Application Data

(63) Continuation of application No. PCT/US2019/053001, filed on Sep. 25, 2019, which
(Continued)

(51) Int. Cl.
*G06F 16/903* (2019.01)
*G06F 12/0802* (2016.01)
(Continued)

(52) U.S. Cl.
CPC .... *G06F 16/90335* (2019.01); *G06F 12/0802* (2013.01); *G06F 16/2315* (2019.01);
(Continued)

(58) Field of Classification Search
CPC ............ G06F 12/0802; G06F 16/2315; G06F 16/90335; G06F 2212/60; G06Q 20/0655; G06Q 20/3829; G06Q 20/389
See application file for complete search history.

(56) References Cited

U.S. PATENT DOCUMENTS 9,122,765 B1 9/2015 Chen
2003/0120544 A1 6/2003 Gritzbach et al.
(Continued)

OTHER PUBLICATIONS

Non-final Office Action dated Jul. 7, 2020, U.S. Appl. No. 16/580,999, filed Sep. 24, 2019.
(Continued)

*Primary Examiner* — Thomas J Dailey
(74) *Attorney, Agent, or Firm* — Vierra Magen Marcus LLP

(57) ABSTRACT

Certain embodiments described herein enable real or near-real time monitoring and updating of analytics associated with transactions performed by a computer system that cause assets to be transferred between accounts of different entities, without necessitating that a query be run against a database that stores transaction data for the transactions performed by the computer system. Other embodiments described herein enable updating of balances in each of a plurality of different accounts without needing to access a database within which data for each of a plurality of processed transactions is stored, and without needing to lock a database, or portion thereof. Still other embodiments overcome other deficiencies of computer systems that are used for processing transactions and providing analytics and feedback relating to the transactions.

17 Claims, 13 Drawing Sheets

Related U.S. Application Data is a continuation-in-part of application No. 16/580,999, filed on Sep. 24, 2019, now Pat. No. 10,901,801.

(60) Provisional application No. 62/736,078, filed on Sep. 25, 2018.

(51) Int. Cl.
*G06Q 20/06* (2012.01)
*G06Q 20/38* (2012.01)
*G06F 16/23* (2019.01)

(52) U.S. Cl.
CPC ....... *G06Q 20/0655* (2013.01); *G06Q 20/389* (2013.01); *G06Q 20/3829* (2013.01); *G06F 2212/60* (2013.01)

(56) References Cited

U.S. PATENT DOCUMENTS

| | | | | |
|---|---|---|---|---|
| 2006/0047718 | A1* | 3/2006 | Keith | G06F 12/0831 |
| 2006/0106675 | A1 | 5/2006 | Cohen et al. | |
| 2007/0106558 | A1* | 5/2007 | Mitchell | G06Q 20/209 |
| | | | | 705/16 |
| 2009/0063413 | A1 | 3/2009 | Lee et al. | |
| 2013/0297655 | A1 | 11/2013 | Narasayya et al. | |
| 2014/0278638 | A1* | 9/2014 | Kreuzkamp | G06Q 10/06398 |
| | | | | 705/7.15 |
| 2014/0279451 | A1* | 9/2014 | Saadat | G06Q 20/02 |
| | | | | 705/40 |
| 2015/0007185 | A1 | 1/2015 | Dey et al. | |
| 2016/0275617 | A1 | 9/2016 | Brocado | |
| 2017/0177808 | A1* | 6/2017 | Irwin | G06Q 40/123 |

OTHER PUBLICATIONS

International Search Report & The Written Opinion of the International Searching Authority dated Jan. 2, 2020, International Application No. PCT/US2019/053001.

Wikipedia, "Hash table," Retrieved from the Internet, [https://en.wikipedia.org/w/index.php?title=Hash_table&oldid=858867029], on Dec. 2, 2019, 17 pages.

Postgresql, "The Statistic Collector," Retrieved from the Internet, [https://web.archive.org/web/20180309055344/https://www.postgresql.org/docs/9.3/static/monitoring-stats.html], on Dec. 3, 2019, 12 pages.

Notice of Allowance dated Dec. 9, 2020, U.S. Appl. No. 16/580,999, filed Sep. 24, 2019.

U.S. Appl. No. 16/580,999, filed Sep. 24, 2019.

* cited by examiner

Incentive ID Cache
400

| Key (i.e., incentive ID) | Value (i.e., n-tuple) | | | | | |
|---|---|---|---|---|---|---|
| | Num. of successful grants | Num. of failed grants | Avg. num. of grants | Min. num. of grants | Max. num. of grants | ... | link to incentive ID DB table |
| 1 | 1222 | 524 | 21 | 2 | 40 | | link-1 |
| 2 | 573 | 104 | 8 | 1 | 45 | | link-2 |
| 3 | | | | | | | |
| ... | | | | | | | |
| M | | | | | | | |

| Account ID | Amount of OIs |
|---|---|
| 1 (e.g., OI pool) | 7300 |
| 2 (end user 1) | 2500 |
| 3 (end user 2) | 250 |
| ... | ... |
| N (end user N-1) | 60 |

Pending Transaction Queue 900

| Transaction ID | Source Account | Destination Account | Amount | Metadata |
|---|---|---|---|---|
| 1 | Account 1 | Account 2 | 500 | {action: unconditional grant} |
| 2 | Account 1 | Account 3 | 200 | {action: conditional grant} |
| 3 | Account 4 | Account 5 | 50 | {action: repayment} |
| ... | | | | |

*FIG. 9*

Balance Cache 1000

| Node (i.e., Account) | Balance (i.e., running tab) | Transaction ID of last transaction from which balance was calculated |
|---|---|---|
| Account 1 | 600 | transaction ID 2 |
| Account 2 | 250 | transaction ID 1 |
| Account 3 | 120 | transaction ID 2 |
| Account 4 | 144 | transaction ID 3 |
| Account 5 | 13 | transaction ID 3 |
| ... | | |

*FIG. 10*

COMPUTER SYSTEM TRANSACTION PROCESSING

PRIORITY CLAIM

This application claims priority to PCT Patent Application No. PCT/US19/53001, filed Sep. 25, 2019, which claims priority to U.S. patent application Ser. No. 16/580,999, filed Sep. 24, 2019, and issued as U.S. Pat. No. 10,901,801 on Jan. 26, 2021, and U.S. Provisional Application No. 62/736,078, filed Sep. 25, 2018, each of which is incorporated herein by reference in its entirety, and each of which priority is claimed to.

BACKGROUND

Conventionally, when performing analytics associated with transactions performed by a computer system that cause assets to be transferred between accounts of different entities, a query typically needs to be run against a database that stores transaction data for the transactions performed by the computer system. However, such database queries are often computationally intensive, thereby tying up limited processing resources of the computer system, and causing latencies beyond acceptable thresholds.

Conventionally, where a computer system is used to perform a transaction that causes the transfer of assets between accounts for which information is stored in a database, the database (or at least a portion thereof) must be locked while the transaction is being processed. This can cause latencies beyond acceptable thresholds, especially where numerous transactions that affect a same account need to be processed by the computer system.

Computer systems are often relied upon to keep track of assets and the transfers thereof between entities. Conventionally, computer systems keep track of ownership rights and manage the transfer of ownership rights in assets in a rigid, static, pre-specified configuration. At best, with the current state of the art, ownership interest management is just a computer-implemented accounting system that primarily just tracks the number of shares granted, a vesting schedule and basic rights. While there do exist some behavior incentivization mechanisms, such as reward points, coupons, discount codes, such mechanisms fall short of providing gamified ownership interest management.

SUMMARY

Certain embodiments of the present technology enable real or near-real time monitoring and updating of analytics associated with transactions performed by a computer system that cause assets to be transferred between accounts of different entities, without necessitating that a query be run against a database that stores transaction data for the transactions performed by the computer system. Such embodiments enable analytics to be performed using significantly less processing resources than would be required compared to if such analytics were performed using database queries, and with significantly less latency compared to if such analytics were performed using database queries.

Certain embodiments of the present technology enable the updating of balances in each of a plurality of different accounts without needing to access a database within which data for each of a plurality of processed transactions is stored. Further, such embodiments beneficially enable the processing of a transaction that involves transferring assets from a first account to a second account, and the updating of a running balance included in a cache entry for the first account and a running balance included in a cache entry for the second account, without data stored in the database for the first and second accounts being locked. This is in contrast to conventional systems and methods that require the locking of a database, or at least a portion thereof, whenever such a transaction is processed.

Still other embodiments of the present technology overcome other deficiencies of computer systems that have been used for processing transactions and providing analytics and feedback relating to the transactions.

This summary is not intended to be a complete description of the embodiments of the present technology. Other features and advantages of the embodiments of the present technology will appear from the following description in which the preferred embodiments have been set forth in detail, in conjunction with the accompanying drawings and claims.

BRIEF DESCRIPTION OF THE DRAWINGS

Embodiments of the present technology relating to both structure and method of operation may best be understood by referring to the following description and accompanying drawings, in which similar reference characters denote similar elements throughout the several views:

FIG. 4A illustrates an example of an incentive ID cache that can be used for tracking and updating analytics associated with transactions performed by a computer system, such as the computer system shown in FIG. 1.

FIG. 9 illustrates how directed graph transaction processing, introduced with reference to FIG. 8, can be represented by tabular relational data in a relational database system.

FIG. 10 shows an example balance cache, which can be used to quickly update and provide access to node (i.e., account) balances in a low latency and computationally efficient manner, in accordance with certain embodiments of the present technology.

DETAILED DESCRIPTION

Figure 1:
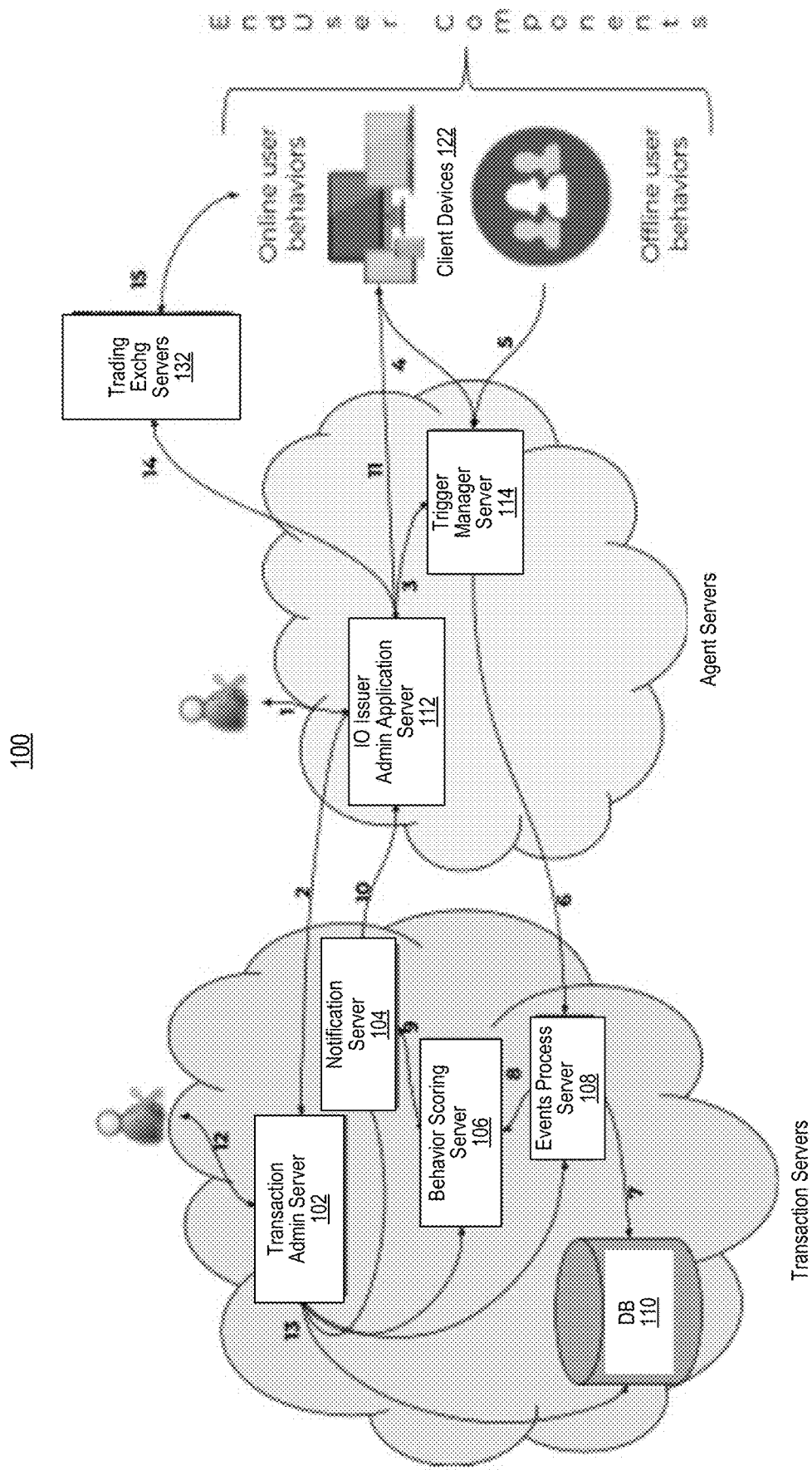
FIG. 1 illustrates a computer system according to an embodiment of the present technology.

FIG. 1 illustrates a distributed computer system 100 according to an embodiment of the present technology, which can also be referred to more succinctly herein as a computer system 100, or even more succinctly as a system 100. As shown in FIG. 1, the system 100 includes transaction servers (represented at the left), agent servers (represented in the middle), and end user components (represented at the right). The transaction server components can include internet-connected server machines operating system software, database servers for long-term storage of the ledger of ownership interest allocations and associated data, and various secondary systems including load balancing, failover, and verification systems. The agent servers can include agent applications running on computers that receive events from the end user components. The agent servers can be operated by a company that issues ownership interests to end users, or by the company that operates the transaction servers. The end user components are the conveyors of end user behaviors (online and offline) via user client devices (also referred to more succinctly as clients) such as web browsers, mobile cellular phones and tablets, laptops and such. End user components can also include proxies that convey offline behaviors such as events. The transaction servers are shown as including a transaction administrative server 102, a notification server 104, a behavior scoring server 106, an events process server 108 that has access to a database 110. Other servers may also have access to the database 110. The agent servers are shown as including an OI issuer administrative application server 112 and a trigger manager server 114. The end user components include client devices 122.

Each client device 122 (which can also be referred to as a work computer) can be used to perform tasks or actions, which in response to being performed, can result in an agent company providing a user of the client device with an ownership interest (OI) in the agent company. Each client device can include a set of programs used to perform the tasks or actions and software embedded in the client device for monitoring performance. Two examples of software used to perform tasks or actions include a browser and a message application. Examples of browsers include Safari, Explorer, Chrome, Firefox, native IOS browsers, native Android browsers, etc. Examples of message applications include email applications, instant messaging applications, and other types of message applications. The monitoring software can include a browser extension (also referred to as a plug-in) which is used to provide additional functionality to a browser and can be used to monitor everything performed within the browser. The monitoring software can also include a plug-in for a message application. Other software being used on a client device can include its own monitoring software. Additionally, the client devices can also include a software application that is not a plug-in, but does monitor one or more other applications. In an alternative embodiment, a client device can include one software application for monitoring multiple applications.

In accordance with certain embodiments, a company (e.g., a technology company, a software company, or the like) that provides, leases or otherwise supports the transaction servers can charge a commission to companies (e.g., banks, retailers, or the like) that provide, lease, or otherwise support the agent servers. A company that provides, leases or otherwise supports the agent servers, or more generally are associated with the agent services, which can be referred to as an agent company, may want to grant an ownership interest (OI) in the agent company to end users. The company that provides, leases or otherwise supports the transaction servers, or more generally is associated with the transaction servers, which can be referred to as the transaction company, can manage the ownership rights and the transfer thereof in ownership interests for an agent company. Such ownership interests may also be referred to herein as securities or assets. For purposes of this document, securities can include any proof of ownership or debt that has been assigned a value and may be sold. Evidence of ownership is likely to be a computer file, but it can also be a written piece of paper. For the holder, a security represents an investment as an owner, creditor or rights to ownership on which the person hopes to gain profit. Examples are stocks, bonds and options. The term "security" can also mean any note, stock, treasury stock, bond, debenture, certificate of interest or participation in any profit-sharing agreement or in a solar power or green energy company, any collateral-trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a "security;" or any certificate of interest or participation in, temporary or interim certificate for, receipt for, or warrant or right to subscribe to or purchase, any of the foregoing. A security, OI, or asset can alternatively be a solicitation of interest as specified in Title 17 CFR § 230.255. Securities can be stored in a pool, which can also be referred to as a securities pool, an asset pool, or as an ownership interest (OI) pool.

Each of the servers and client devices described herein can include one or more processors (each including one or more core), one or more network interfaces (e.g., Ethernet and/or WiFi), persistent storage (e.g., hard disk drive and/or solid state drive), memory, and other peripherals all connected together via a bus or other structure. Software (i.e., processor readable code) stored in the persistent storage and/or the memory can be used to program the processor(s) to perform the methods/processes described below. The servers and client devices can also include user interfaces that enable administrators, end users, or the like, to interface with the servers or client devices. The various servers and client devices can communicate with one another using one or more networks to which they are coupled, including, but not limited to, the Internet, a local area network (LAN), a wide area network (WAN), a virtual private network (VPN), or any other network or combinations of networks. Such networks, or portions thereof, can be wired, wireless, optical, etc. Embodiments of the present technology are not tied to any particular type of network. Rather, what is important is that the various components, or at least a subset of the various components, can communicate as described herein.

The administrative application server 112 may be accessed by an administrator of an agent company to define OI pools, triggers by which end users can earn OIs from each pool, under what circumstances and conditions those grants will be offered, to whom specific grants will be offered, as well as to enable transfer of users' trading interactions to feed into an OI administration service. These processes are represented by the arrowed line labeled 1 on FIG. 1.

The administrative application server 112 programmatically creates the OI pools and triggers on the transaction administrative server 102 specific to the OI issuer (i.e., agent). The OI transaction server generates unique identifiers (UIDs) for the OI issuer (i.e., agent) for one or more OI pools. These processes are represented by the arrowed line labeled 2 in FIG. 1.

The administrative application server 112 configures the trigger manager server 114 with the UIDs for the OI pools and trigger events, which processes are represented by the arrowed line labeled 3 in FIG. 1. Where an OI pool is used to provide OIs (a.k.a. securities) in response to certain incentivized actions (a.k.a. incentives), the UID for the OI pool can also be referred to as an incentive pool ID. In other words, an incentive pool ID is a type of UID. Each incentivized action can also have its own UID, which can be referred to as the incentive ID. In certain embodiments, more than one type of incentive can be used to obtain OIs from the same OI pool, with each of the different types of incentives having its own unique incentive ID. A type of incentive can also be referred to herein as an incentive category, and thus, each incentive category can have its own unique incentive ID.

End users interact with agent applications (e.g., plug-ins) installed on their client devices 122, and for a more specific example, using a browser (or browser plug-in) installed on their client devices. When a user interacts with an agent application, i.e., performs some type of agent related action, an action notification is sent from the client device to the trigger manager server 114, which processes are represented by the arrowed line labeled 4 in FIG. 1. Such actions, which are performed by end users using client devices may be referred to herein as online actions. Examples of such online actions include, but are not limited to, using a product or service, purchasing a product or service, promoting or otherwise referring to a product or service in social media, referring a product or service to one or more individuals or one or more groups, holding onto securities (a.k.a. OIs or assets) for long periods of time, or other actions. Where an action results in a grant of a security (a.k.a. an OI or an asset) to an end user, the end user can view the grant via their client device using the agent application, as will be discussed in further detail below. Further, the user can view the quantity and type of securities that they have, as well as the types of grants (e.g., vested or conditional, but not limited thereto). End users may also receive grants of securities for participating in offline behaviors (such as attending an OI issuer-sponsored events). Proof of such offline activities can be submitted to the trigger manager server 114 by end users, or by entities that sponsor or facilitate an offline event. Either way, offline action notifications can be funneled to the trigger manager server 114, with such processes being represented by the arrowed line labeled 5 in FIG. 1.

The trigger manager server 114 creates events for qualifying actions and notifies the events process server 108 by sending event notifications to the events processor server 108, which processes are represented by the arrowed line labeled 6 in FIG. 1. The event processor server 108 qualifies the event for granting assets (i.e., one or more securities) to an end user, and records an entry in database 110, which processes are represented by the arrowed line labeled 7 in FIG. 1. Additional details of how entries can be recorded in the database 110, which can function as a transaction leger, are discussed below.

The events process server 108 provides a notification of user behavior (which resulted in a grant of one or more securities to an end user) to the behavior scoring server 106, which processes are represented by the arrowed line labeled 8 in FIG. 1. The behavior scoring server 106 can store notifications of user behavior and use such notifications to determine and update behavior scores of users. This data provides a window into the end user's habits, and is processed in aggregate to generate a multi-dimensional score for that end user. Additional details of how behavior scores can be determined and updated are discussed below.

The behavior scoring server 106 deduplicates and compiles meaningful insights for end users and for the OI issuer administrator and provides it to the notification server 104, which processes are represented by the arrowed line labeled 9 in FIG. 1.

The notification server 104 provides the insights that are subscribed to by the issuer administrator and end users via the OI issuer administration application server 112, which processes are represented by the arrowed line labeled 10 in FIG. 1.

An OI issuer administrator can (selectively/automatically) encourage users to take incentivized behaviors/actions. Administrative users can reference one or more behavior scores, discussed in more detail below, to allocate, adjust, and create algorithms that automatically attenuate share grants and vesting schedules based on the scores and the changes in scores. Such processes are represented by the arrowed line labeled 11 in FIG. 1.

An administrator for a company that provides or otherwise supports the transaction servers can query the state and status of all the transaction server components via the transaction administration server 102, which processes are represented by the arrowed line labeled 12 in FIG. 1.

The transaction administration server 102 maintains two-way communication with all the transaction server components to enable debugging, manual operations, data validation, backup and recovery operations, which processes are represented by the arrowed lines labeled 13 in FIG. 1.

The OI issuer administrative application server 112 maintains data exchange with trading exchange servers 132 to enable transfer of customers' unconditional ownership interests, which processes are represented by the arrowed line labeled 14 in FIG. 1. End users (a.k.a. customers) can manage their ownership rights on their broker's online portals, which processes are represented by the arrowed line labeled 15 in FIG. 1. The links to trading exchange servers 132, which links are also represented by the arrowed lines labeled 14 and 15, allow for the trading of vested unconditional ownership rights (a.k.a. OIs, securities, or assets).

In accordance with certain embodiments, the OI issuer administrative application server 112 is a web server that supports a web application, e.g., a portal application, that provides an application programming interface (API), which allows authorized administrators to: create Ownership Interest (OI) pools, which are also referred to as securities pools or asset pools; set up the conditions for grants of securities that will be offered; create or define triggers by which end users can earn OIs from each pool; get accurate status and accounting for all OI pools; topup OI pools for grant to users; observer patterns of access by the users; boost OI pool weights for anticipated behaviors; and issue notifications.

Figure 2:
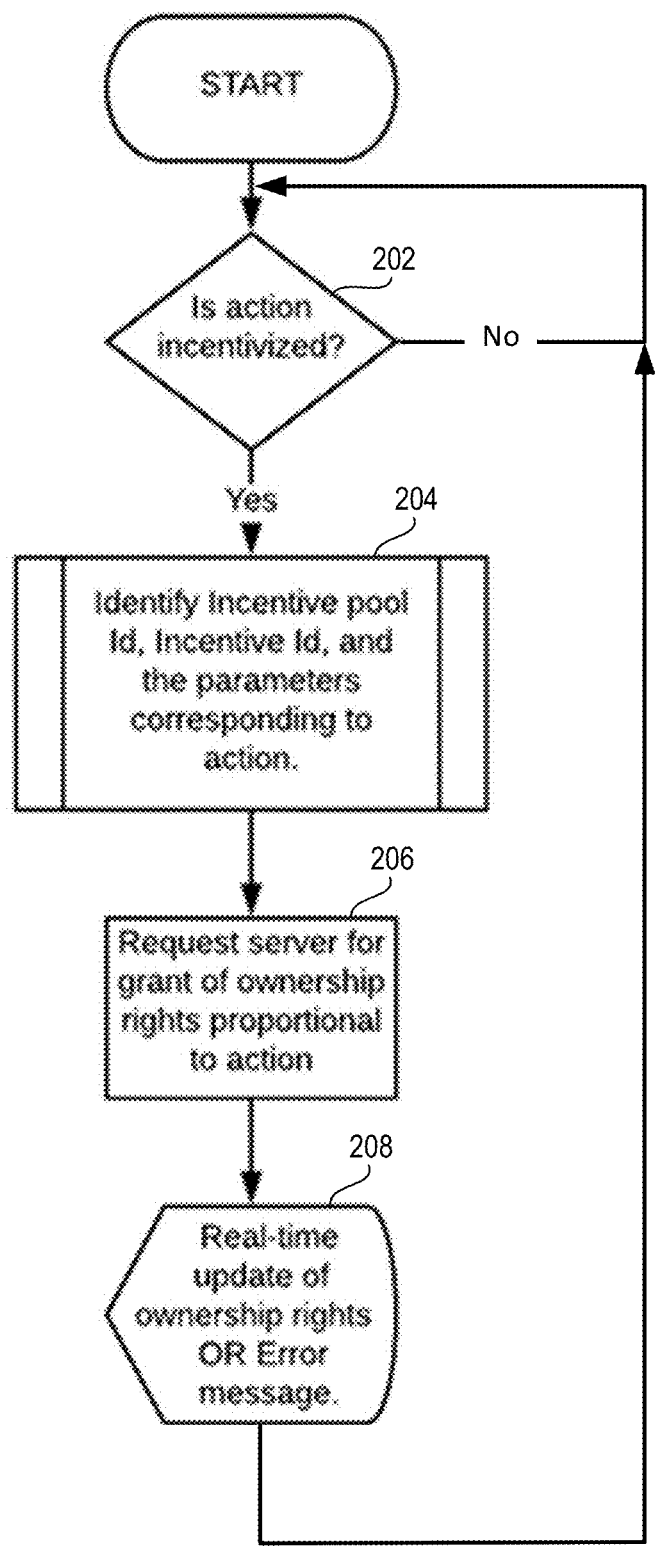
FIG. 2 is a high level flow diagram used to describe steps of a method, according to an embodiment of the present technology, performed by a trigger manager server introduced in the discussion of FIG. 1.

Referring to FIG. 2, the steps shown therein start in response to the trigger manager server 114 receiving a notification of an action of an end user from a client device 122, which notification is generally represented by the arrowed line 4 in FIG. 1 discussed above. Where the action is an offline action, a proxy notification for the end user's action can be provided to the trigger manager server 144, which notification is generally represented by the arrowed line 5 in FIG. 1 discussed above. More generally, the trigger manager server 114 responds to actions performed by end users, wherein some types of actions may be incentivized, while other types of actions may not be incentivized. An example of an incentivized action is referring another end user to a specific product or service. An example of an action that is not incentivized is an end user checking the balance on their account, or an end user exchanging OIs in an OI issuer's company for some other type of security unrelated to the OI issuer's company. In certain embodiments, every type of possible action can have its own unique action ID. Alternatively, only actions that are incentivized have their own unique action ID. Either way, each type of action that is incentivized is associated, e.g., by a table, with an incentive ID. There can be a one-to-one correspondence between action IDs and incentive IDs. Alternatively, more than one action ID can be associated with a same incentive ID.

At step 202 in FIG. 2, there is a determination of whether an action (identified by a notification received by the trigger manager server 114) is incentivized. If the answer to the determination at step 202 is no, the flow returns to step 202 to see if the next action (identified by a notification received by the trigger manager server 114) is incentivized. Action notifications that are received by the trigger manager server 114 can be stored in a queue or buffer, such as a first in first out (FIFO) buffer, but that need not be the case.

If the answer to the determination at step 202 is yes, then flow goes to step 204. At step 204 an incentive pool ID and an incentive ID (for the incentivized action) are identified by the trigger manager server 114. Additionally, parameters corresponding to the incentivized action can also be identified at step 204. For example, if an incentivized action is an end user referring another end user to a specific product or service, the parameters corresponding to the action can include an ID of the end user that made the referral, and an ID of the end user to which the referral was sent. Further, if an incentivized action is purchasing a certain product or service, the parameters corresponding to the action can include the units of the product or service purchased, or the like. Alternative and/or additional types of parameters corresponding to an action can be identified at step 204.

As noted above, the trigger manager server 114 creates events for qualifying actions and notifies the events process server 108 by sending event notifications to the events process server 108, which processes were represented by the arrowed line labeled 6 in FIG. 1. An event notification that is sent by the trigger manager server 114 to the events process server 108 can be a request for a grant of ownership rights proportional to the action taken by the end user, as indicated by the step 206 shown in FIG. 2. At step 208 records of ownership rights are updated where a grant of ownership rights is provided in response to the request at step 206. Alternatively, an error message can occur at step 208, e.g., if there are no more ownership rights available from the relevant OI pool, or the like. Flow then returns to step 202 to check whether another action to be processed is incentivized or not.

Figure 3:
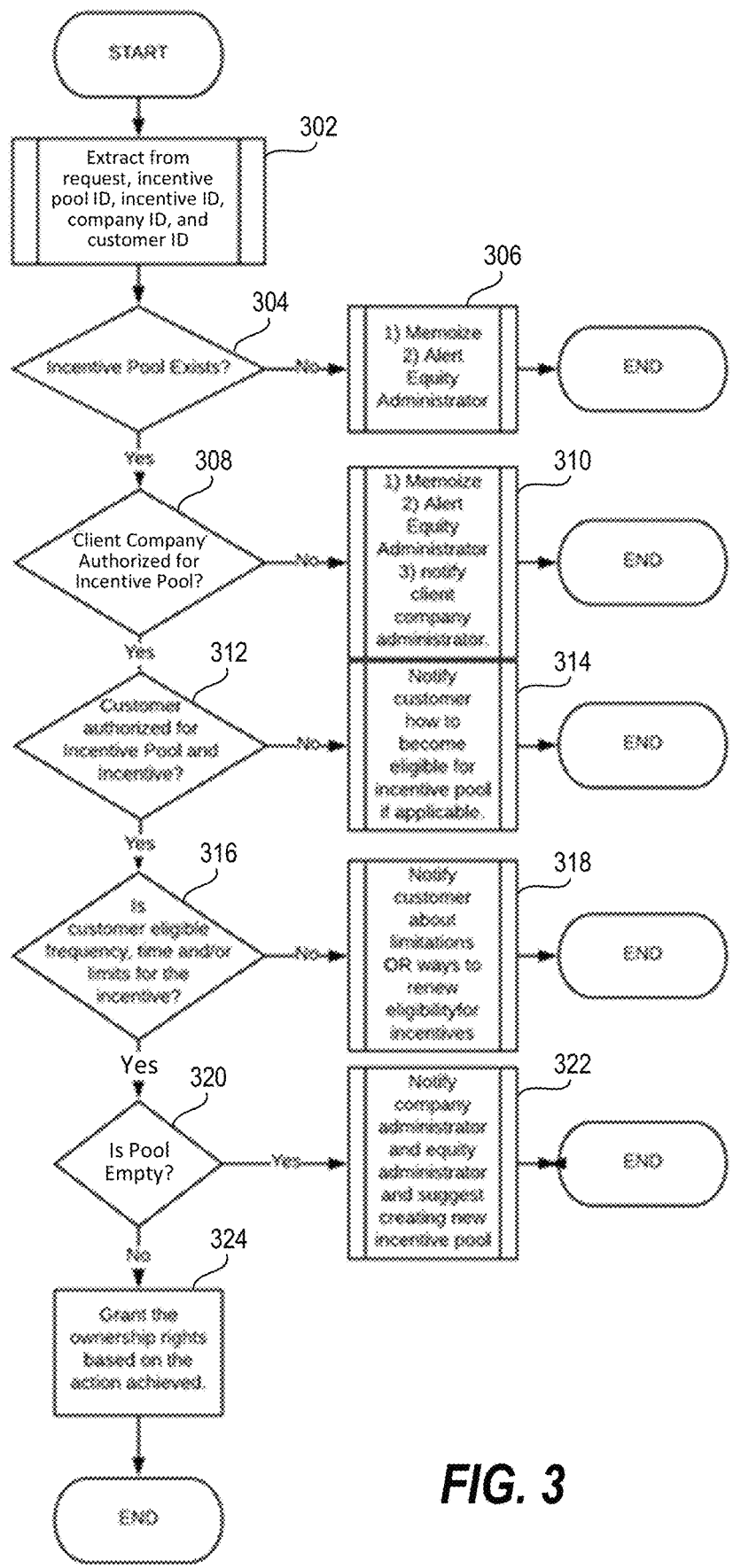
FIG. 3 is a high level flow diagram used to describe steps of a method, according to an embodiment of the present technology, performed by an event process server introduced in the discussion of FIG. 1.

Referring to FIG. 3, the steps shown therein start in response to the event process server 108 receiving a request for a grant of ownership (sent by the trigger manager server 114 at step 206 in FIG. 3), which sending and receiving of the request for grant of ownership is generally represented by the arrowed line 6 in FIG. 1 discussed above. A grant of ownership is also referred to herein as an ownership interest (OI), a security, or an asset. Such ownership interest (OIs) are stored in an OI pool (a.k.a., a securities pool or asset pool) that is defined by a company. At step 302, the event process server 108 extracts an incentive pool ID and an incentive ID from the request. Additionally, at step 302 the event process server 108 extracts a company ID and a customer ID from the request, wherein the customer ID identifies the company that is offering grants of ownership from an OI pool, and the customer is the end user that performed an incentivized action.

At step 304 there is a determination of whether the incentive pool, corresponding to the incentive pool ID extracted at step 302, exists. If the answer to the determination at step 304 is no, meaning that an incentive pool corresponding to the extracted incentive ID does not exist, then flow goes to step 306. At step 306 the information extracted at step 302 and/or the negative result of the determination is memoized, and an appropriate equity administrator is alerted. If the answer to the determination at step 304 is yes, then flow goes to step 308.

At step 308 there is a determination of whether a client company (also referred to as an agent company) corresponding to the incentive pool ID and/or incentive ID has authorized the granting of ownership interests (a.k.a. securities) from the incentive pool corresponding to the extracted incentive pool ID. If the answer to the determination at step 308 is no, then flow goes to step 310. At step 310, the negative result of the determination is memoized, an appropriate equity administrator is alerted, and an administrator of the client company (a.k.a. agent company) offering ownership interests (a.k.a. securities) is notified. If the answer to the determination at step 308 is yes, then flow goes to step 312.

At step 312 there is a determination of whether the customer (e.g., end user) is authorized to receive the incentive (e.g., a grant of an ownership interest corresponding to the extracted incentive ID) from the incentive pool (corresponding to the extracted incentive pool ID. If the answer to the determination at step 312 is no, then flow goes to step 314. At step 314 the customer (e.g., end user) is notified how they can become eligible for the incentive pool, if applicable, e.g., by signing up or purchasing a certain product or service, by submitting Know Your Customer (KYC) and/or Anti-Money Laundering (AML) documents, but not limited thereto. If the answer to the determination at step 312 is yes, then flow goes to step 316.

At step 316 there is a determination of whether the customer (e.g., end user) is eligible for the grant of ownership interest, e.g., in view of frequency of certain actions, time and/or limits for the incentive. For example, there can be a limit to how many times an end user can receive a grant of ownership for performing a specific incentivized action. For another example, there can be a limit to how many grants of ownership can be awarded to an end user within a specified time period. For still another example, certain types of incentives may expire, e.g., there may be a deadline by which an incentivized action must be performed to receive an ownership interest for performing that action. If the answer to the determination at step 316 is no, then flow goes to step 318. At step 318 the customer (e.g., end user) is notified about the limitations (i.e., why they were not granted the ownership interest). Additionally, or alternatively, at step 318 a customer can be notified as to how they may be able to again become eligible for a certain type of incentive. If the answer to the determination at step 316 is yes, then flow goes to step 320.

At step 320 there is a determination of whether or not the pool, corresponding to the incentive pool ID, is empty. If the answer to the determination at step 320 is yes, then flow goes to step 322. At step 322 the administrator for the company that offered ownership interests corresponding to the incentive pool is notified that the incentive pool is empty. Such a notification can recommend the creating of a new incentive pool, or the refilling of or adding to the incentive pool. If the answer to the determination at step 320 is no, then flow goes to step 324.

At step 324 ownership rights (i.e., one or more OIs, a.k.a. securities or assets) are granted based on the action performed by the end user. Granting of ownership rights will typically involve the transfer of assets from one account (e.g., of an OI issuer company) to another account (e.g., of an end user that performed an incentivized action). Flow can then return to step 208 in FIG. 2. Flow can also return to step 208 in FIG. 2 after any one of steps 306, 310, 314, 318, or 322 is performed.

As noted above, the events process server 108 provides a notification of user behavior (which resulted in a grant of one or more securities to an end user) to the behavior scoring server 106, which processes are represented by the arrowed line labeled 8 in FIG. 1. The behavior scoring server 106 can store notifications of user behavior and use such notifications to determine and update behavior scores of end users. This data provides a window into the end user's habits, and is processed in aggregate to generate a multi-dimensional score for that end user, as described in additional detail below.

As noted above, each type of action that is incentivized is associated, e.g., by a table, with an incentive ID. As also noted above, an event notification that is sent by the trigger manager server 114 to the events process server 108 (in response to an action performed by an end user) can be a request for a grant of ownership rights proportional to the action taken by the end user, as indicated by the step 206 shown in FIG. 2. Such a request can include various types of information corresponding to the action, including, e.g., an incentive ID, an incentive pool ID, a company ID, and an end user ID, as was described above with reference to FIG. 2. As requests are processed, each request can either result in a successful grant of one or more ownership interests or a failed grant. Associated with each successful grant can be certain types of information, such as, a number (i.e., quantity) of grants, as well as whether the grants are vested or conditional. Further, for each conditional grant, there can be information that specified what conditions need to be satisfied for the conditional grant to be converted to a vested grant. In accordance with certain embodiments, where the conditions are not satisfied within some specified period of time, conditional grants are returned to the ownership interest pool from which they came.

As can be appreciated from the above discussion, actions performed by end users will cause transactions to be performed by the system 100, and more specifically, by the various servers of the system 100. For example, certain transactions are performed by the events process server 108, other transactions are performed by the behavior scoring server 106, further transactions are performed by the notification server 104, etc. Some of the transactions are very computationally intensive and would be very unwieldy (i.e., too slow and computationally intensive) to perform on a real-time or near-real time basis. In accordance with certain embodiments of the present technology, in order to reduce latency and reduce the computational resources used to perform certain transactions, various types of caches are advantageously utilized.

More specifically, in accordance with certain embodiments of the present technology, a plurality of key-value pairs (KVPs) are stored within an incentive ID cache, wherein the key is an incentive ID, and the value is a tuple, which is a finite ordered list (sequence) of elements. For example, an n-tuple is a sequence (ordered list) of n elements, where n is a positive integer. For each KVP included within the incentive ID cache, the value (tuple) can include various details associated with the incentive ID, such as, but not limited to: a number of successful grants, a number of failed grants, an average number of grants provided in response to a request that resulted in a successful grant, a maximum number of grants provided in response to a request that resulted in a successful grant, a minimum number of grants provided in response to a request that resulted in a successful grant, a link to an incentive ID specific database table or entry, and/or other running computations. An example of the above discussed incentive ID cache is shown in FIG. 4A. Referring to FIG. 4A, the incentive ID cache 400 shown therein can be used by the behavior scoring server 106. In accordance with certain embodiments, the incentive ID cache 400 stores data that is computed on demand rather than retrieved from a backing store, such as a table stored within a database (e.g., 110). In accordance with certain embodiments, memoization is performed in order to store results of resource-consuming function calls within the incentive ID cache 400, thereby allowing subsequent calls to reuse the cached results and avoid repeated computations when possible. In FIG. 4, each of the rows $412_1$, $412_2$, $412_3$, . . . $412_M$ correspond to an incentive ID cache entry, wherein the rows can be collectively referred to as the rows 412 or cache entries 412, or can be individually referred to as a row 412 or a cache entry 412.

Figure 4B:
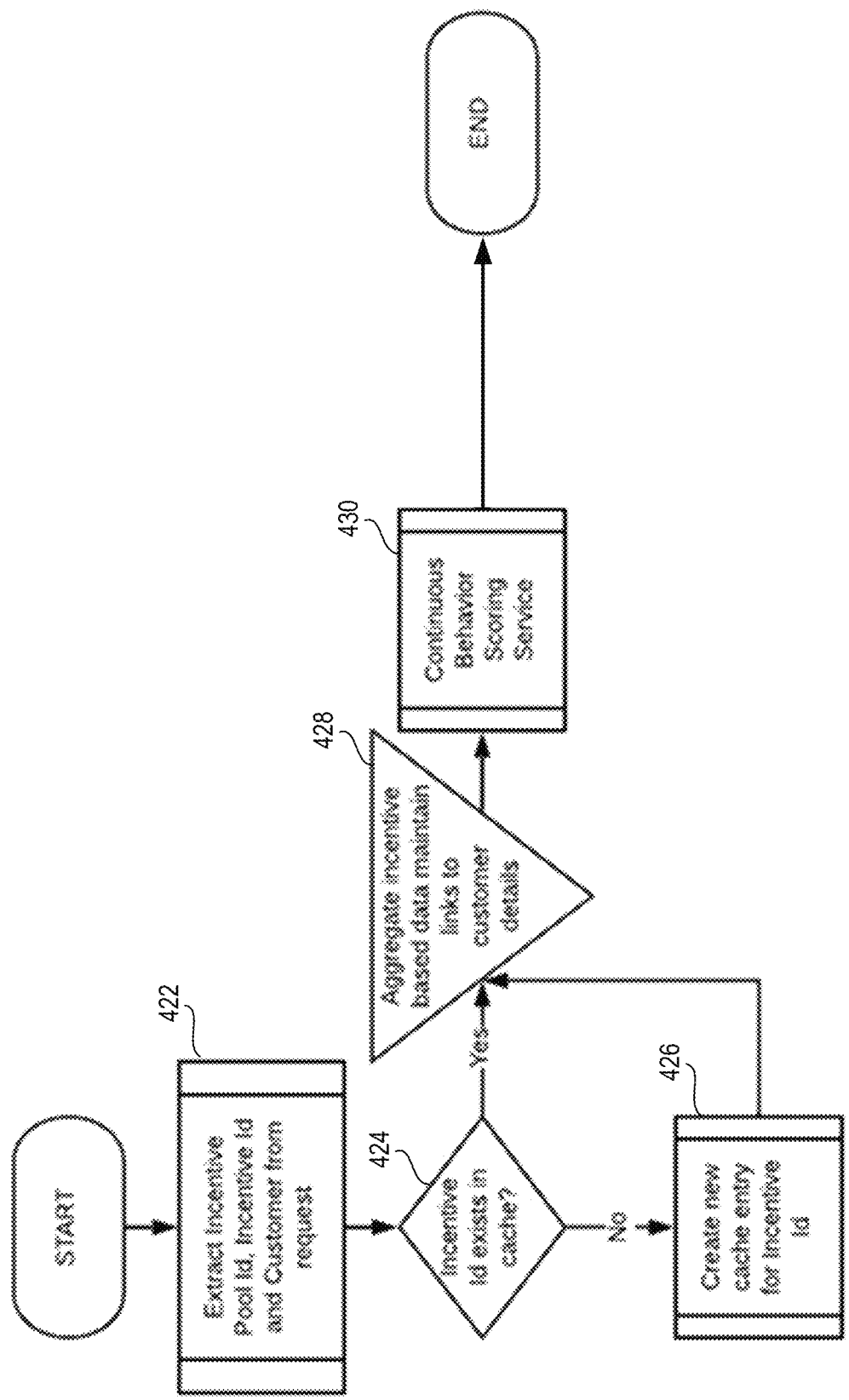
FIGS. 4B and 4C are high level flow diagram used to describe steps of methods, according to certain embodiments of the present technology, performed by a behavior scoring server introduced in the discussion of FIG. 1.
Figure 4C:
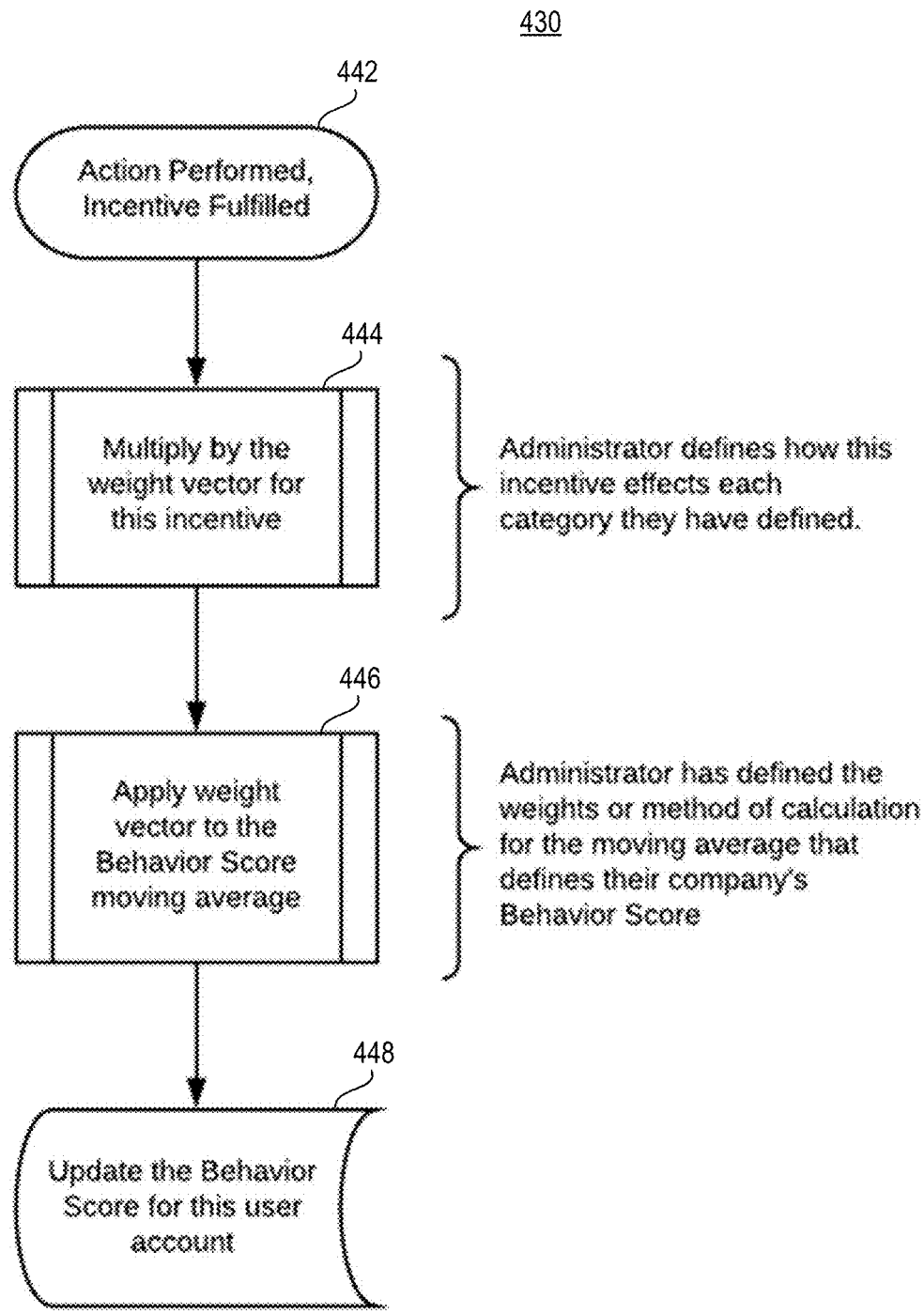

FIGS. 4B and 4C are high level flow diagrams used to describe steps of methods, according to certain embodiments of the present technology, performed by the behavior scoring server 106 to produce or update behavior scores for end users in a computationally efficient manner. Such methods use the incentive ID cache 400 to reduce the latency and computational resources needed to repeatedly update behavior scores.

Referring to FIG. 4B, at step 422, the behavior scoring server 106 extracts an incentive pool ID and an incentive ID from a request that resulted in one or more ownership interests (a.k.a. securities or assets) being granted, wherein the request for a grant of ownership can be the same request referred to at step 206 in FIG. 2. Additionally, at step 422 the behavior scoring server 106 extracts a customer ID from the request, wherein the customer can be an end user that performed an incentivized action.

At step 424 there is a determination of whether the incentive ID exists in the incentive ID cache (e.g., 400 in FIG. 4A). If the answer to the determination at step 424 is no, then flow goes to step 426. At step 426 a new cache entry (e.g., 412 in FIG. 4A) is created within the incentive ID cache (e.g., 400 in FIG. 4A). This way, the next time an instance of step 424 is performed for the incentive ID (for which a cache entry is created at step 426), the answer to the determination at step 424 will be yes, and flow would go directly from step 424 to step 428.

If the answer to step 424 is yes, then flow goes to step 428. Step 428 involves performing statistical aggregation of incentive based data to maintain links to a database (e.g., 110) that stores customer details, including behavior scores of customers (a.k.a., end users). Such a database can store a table that can be fetched on-demand so that drill-down analysis can be performed and each grant can be examined including the customer detail. More specifically, at step 428 the incentive ID cache (e.g., 400) can be updated based on the most recently processed request for which the incentive ID was extracted, without needing to run a query against a database (e.g., 110) that includes a separate entry for every request that is processed. For example, referring again to FIG. 4A, assume that the incentive ID that is extracted from a request is incentive ID 2, and that in response to the request being processed and completed, a particular end user was granted 50 units of an ownership interest (a.k.a., securities) in a company. This would cause the value in the incentive ID cache 400 for the number of successful grants for incentive ID 2 to be updated from 573 to 623 (i.e., 573+50=623); the value for the average number of grants to be updated from 8 to an increased value; and the value for the maximum number of grants to be updated from 45 to 50. Such updates to the incentive ID cache 400 enable fast and computationally efficient tracking and updating of analytics associated with transactions performed by a computer system (e.g., 100).

Referring again to FIG. 4B, at step 430 continuous behavior scoring is performed, and more specifically, a behavior scoring process, described below with reference to FIG. 4C, is performed. The results of step 430 are behavior scores produced by the behavior scoring server 106, which scores are provided to the notification server 104. FIG. 4C, discussed below, is used to describe how behavior scoring can be performed, at each instance of step 430 in FIG. 4B. The behavior scoring process can be instantiated in response to an end user performing an incentivized action, as can be appreciated from the oval 442 in FIG. 4C.

An administrator for a company (a.k.a.) agent that issues ownership interests (OIs) in their company can interface with the OI issuer notification application server 112 (as indicated by the arrowed line labeled 1 in FIG. 1) to create a set of behavioral categories to segment and measure the actions of end users. Such segmentation helps identify the best users to accomplish the actions to maximize furtherance of the goals of the pool creator (i.e., the company the issues the OIs). In accordance with certain embodiments, a behavior score is represented as a vector of numeric values, one for each category. Actions that trigger conditional grants to become unconditional apply to each category by a vector of action weights.

As end users are continuously interacting with the system 100 and demonstrate various behaviors, certain categories of ownership interest pools dedicated to rewarding certain behaviors may get overutilized while others are underutilized. In accordance with certain embodiments, allocations of ownership interests are continuously curated so that the issuing company is able to incentivize and drive behaviors that are desired. The output of companies' analytics systems can dynamically feed into the process of granting ownership interests, influencing to whom and under what conditions ownership interests are allocated.

Behavior scores can be determined for companies that offer ownership interests to end users, as well as to individual end users of a company's products or services. A behavior score for a company may indicate which incentive categories and specific incentives are being efficiently utilized versus the other ones. A behavior score for an end user can indicate which incentive categories the particular end user has efficiently utilized versus the other ones. For an example, an end user may have been granted ownership interests in a company for performing certain actions within certain categories, such as onboarding and signup incentive categories, but not have been granted all the potential grants for an engagement category. Drilling down further, an end user may have been using a certain service or product (e.g., a debit card) associated with a specific incentive, e.g., 2% shares back, which would give the end user a high behavior score for that specific incentive. However, that same end user may have a low behavior score for other types of incentives, such as referring others to a product or service. For such an end user, analysis of the end user's behavior scores can be used to redefine the types and/or magnitude of ownership interests that the end user is offered for performing certain actions, thereby encouraging the end user to participate in certain actions (e.g., referrals) to earn more ownership rights for that category and specific incentive. An incentive category is a superset of different types of incentives. In other words, an incentive category can be considered an overall umbrella that could have multiple incentive IDs. For example, incentive categories can include onboarding, activation, and engagement. Within each incentive category there can be multiple incentives, each having its own incentive ID and optionally its own time constraint. For example, different types of incentives that are included with the onboarding category can include: installing an application on a client device; creating a user account; and opening an account. For another example, different types of incentives that are included in the activation category can include: setting up a direct deposit; and activating a product or service.

In accordance with certain embodiments, each behavioral action has a weight (W) for each category (C). This can be described as a vector of weights which, when applied to an action, results in a factor which is a part of a moving average calculation called the end user's "behavior score". Below is an exemplary representation of such a vector of weights, which can also be referred to as an incentive weight vector.

$$W = \begin{bmatrix} w_{C_1} \\ w_{C_2} \\ \vdots \\ w_{C_n} \end{bmatrix}.$$

In accordance with certain embodiments, determining/updating a behavior score value for a particular category involves taking the last n actions, where n is a defined limit of the number of previous actions to take into account, calculating the weight of that action for that category, and averaging all those values according to the type of moving average an administrator for the OI issuing company has configured. These processes are represented by steps 444 and 446 in the flow diagram of FIG. 4C. At step 444 it can be a scalar that is multiplied by the weight vector for the incentive. Examples of such scalars are discussed below. More specifically, to obtain a behavior score for a particular category, $G_{C_x}$, the OI issuing company defines a number of samples, n, to include in a behavior score calculation, e.g. only the last 30 actions the end user has taken are applied to calculate $G_{C_x}$. The OI issuing company can also define a maximum amount of time, past which actions are not factored in, e.g. n actions within the last year.

Taking Category$_1$ ($C_1$) as an example, the Behavior Score $G_{C_1}$ for all actions over Category$_1$ can be calculated, in accordance with certain embodiments of the present technology, using the following equation:

$$G_{C_1} = \frac{s_1 W_{C1}(A_1) + s_2 W_{C1}(A_2) + s_3 W_{C1}(A_3) + \ldots + s_n W_{C1}(A_n)}{n},$$

where
- $s_x$ is a scalar for a scalar for accomplishment of Action$_x$ ($A_x$),
- $W_{c_x}(A_1)$ is a weighting function for Action$_x$ over Category$_1$,
- $G_{C_1}$ is the Behavior Score for all actions over Category$_1$, and
- n is the number of Action scores being averaged.

The scalar $s_x$ will normally be either 1 or 0 when an action is either complete or incomplete, respectively. If there are gradations of completion available for an action, it can be represented by a number which scales this action's behavior score factor across all categories. This can also be changed to apply a scaling factor over all categories to make a particular action affect the Behavior Score to a greater or lesser degree than the default of 1. More generally, in accordance with certain embodiments, each factor to be added above is the action's weight for this category can be multiplied by the scaling factor for the action.

In accordance with certain embodiments, a behavior score (G) across all defined is a vector of such values, one for each category, as shown below:

$$G = \begin{bmatrix} G_{C1} \\ G_{C2} \\ \vdots \\ G_{C_n} \end{bmatrix}.$$

In accordance with certain embodiments of the present technology, when determining how to apply conditional grants for a particular campaign across a broad base of end users, the OI Issuer Administration Server 112 allows multiple inputs to dynamically determine which end users receive the conditional grants, and under what conditions. Behavior score data can be fed directly into an issuing company's data pipelines and be combined with existing analytics systems. The categories defined for the behavior score can be used within data analysis pipelines to assign end users to particular segments.

Due to the high frequency of transactions (corresponding to actions performed by end users), it would be unwieldy to repeatedly rerun the above described behavior scoring algorithm on customer behavior data. To overcome this problem, in accordance with certain embodiments of the present technology, data indexed by its incentive category is cached, such that the behavior scoring algorithm can be performed in a more computationally efficient manner, thereby reducing the computer processing resources needed to continually update behavior scores. In accordance with certain embodiments, the behavior scoring algorithm is used to produce memos that are actionable to an issuing company administrator using automated or manual steps.

Figure 5:
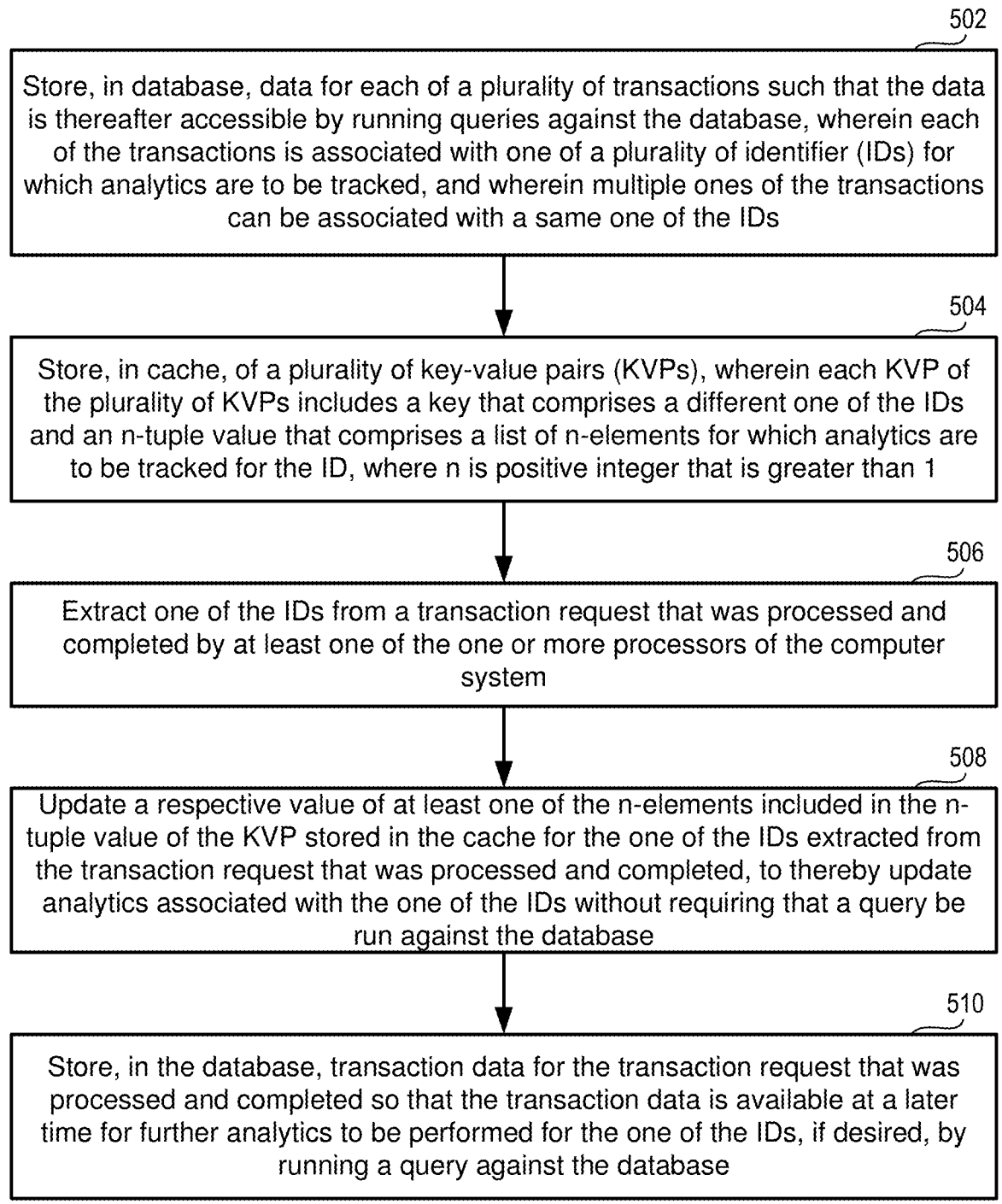
FIG. 5 is a high level flow diagram used to describe steps of a method, according to an embodiment of the present technology, that can be used to track and update analytics associated with transactions performed by a computer system.

The high level flow diagram of FIG. 5 will now be used to describe steps of a method, according to an embodiment of the present technology, that can be used to track and update analytics associated with transactions performed by a computer system (e.g., 100). Referring to FIG. 5, step 502 involves storing, in a database (e.g., 110), data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs. In accordance with certain embodiments, the IDs are incentive IDs.

Step 504 involves storing, in a cache, of a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1. In accordance with certain embodiments, the cache is an incentive ID cache. An example incentive ID cache 400 is shown in FIG. 4A, which was discussed above.

Step 506 involves extracting one of the IDs from a transaction request that was processed and completed by at least one of the one or more processors of the computer system. Further, step 508 involves updating a respective value of at least one of the n-elements included in the n-tuple value of the KVP stored in the cache for the one of the IDs extracted from the transaction request that was processed and completed, to thereby update analytics associated with the one of the IDs without requiring that a query be run against the database. An example of how a KVP (or more generally a cache entry) can be updated was discussed above with reference to FIG. 4A, and is repeated here. Referring back to FIG. 4A, assume that the incentive ID that is extracted (at step 506) from a request is incentive ID 2, and that in response to the request being processed and completed, a particular end user was granted 50 units of an ownership interest (a.k.a., securities) in a company. This would cause the value in the incentive ID cache 400 for the number of successful grants for incentive ID 2 to be updated from 573 to 623 (i.e., 573+50=623); the value for the average number of grants to be updated from 8 to an increased value; and the value for the maximum number of grants to be updated from 45 to 50. Such updates to the incentive ID cache 400 enable fast and computationally efficient tracking and updating analytics associated with transactions performed by a computer system (e.g., 100).

Referring again to FIG. 5, step 510 involves storing, in a database (e.g., 110), transaction data for the transaction request that was processed and completed so that the transaction data is available at a later time for further analytics to be performed for the one of the IDs, if desired, by running a query against the database.

Each transaction request that is processed can either be completed or not completed. For example, a completed transaction can result in assets (a.k.a., OIs or securities) being transferred from a source account to a destination account, wherein each account is associated with an account ID. By contrast, a transaction that is not completed will not result in assets being transferred from a source account to a destination account, e.g., because there were insufficient assets in the source account, or because an entity associated with the destination account did not qualify for the grant, etc.

Accordingly, it should be appreciated that the method summarized with reference to FIG. 5 can also include extracting a further one of the IDs (e.g., incentive IDs) from a further transaction request that was processed and not completed. When this occurs, the method can also include updating a respective value of at least one of the n-elements included in the n-tuple value of the KVP stored in the cache (e.g., the incentive ID cache 400) for the further one of the IDs extracted from the further transaction request that was processed and not completed, to thereby update analytics associated with the further one of the IDs without requiring that a query be run against a database (e.g., 110). For example, the number of failed grants included in one of the cache entries 412 may be updated. The method can further involve storing, in the database (e.g., 110), further transaction data for the further transaction request that was processed and not completed so that the further transaction data is available at a later time for further analytics to be performed for the further one of the IDs, if desired, by running a query against the database.

As noted above, each of the IDs referred to in the flow diagram of FIG. 5 can be an incentive ID. Each such incentive ID can be associated with a campaign for which analytics are to be tracked. Further, as noted above, the cache referred to in the flow diagram of FIG. 5 can be an incentive ID cache, in which case storing the KVPs in the incentive ID cache enables analytics associated with a campaign to be updated in real or near-real time without requiring that a query be run against a database. Further, as noted above, the transaction request referred to in the flow diagram of FIG. 5, which request is processed and completed by at least one of the one or more processors of the computer system, can cause a transfer of one or more assets from a first entity to a second entity. Additionally, as noted above, where a further transaction request that was processed is not completed, the noncompleted transaction does not cause a transfer of one or more assets.

Figure 6:
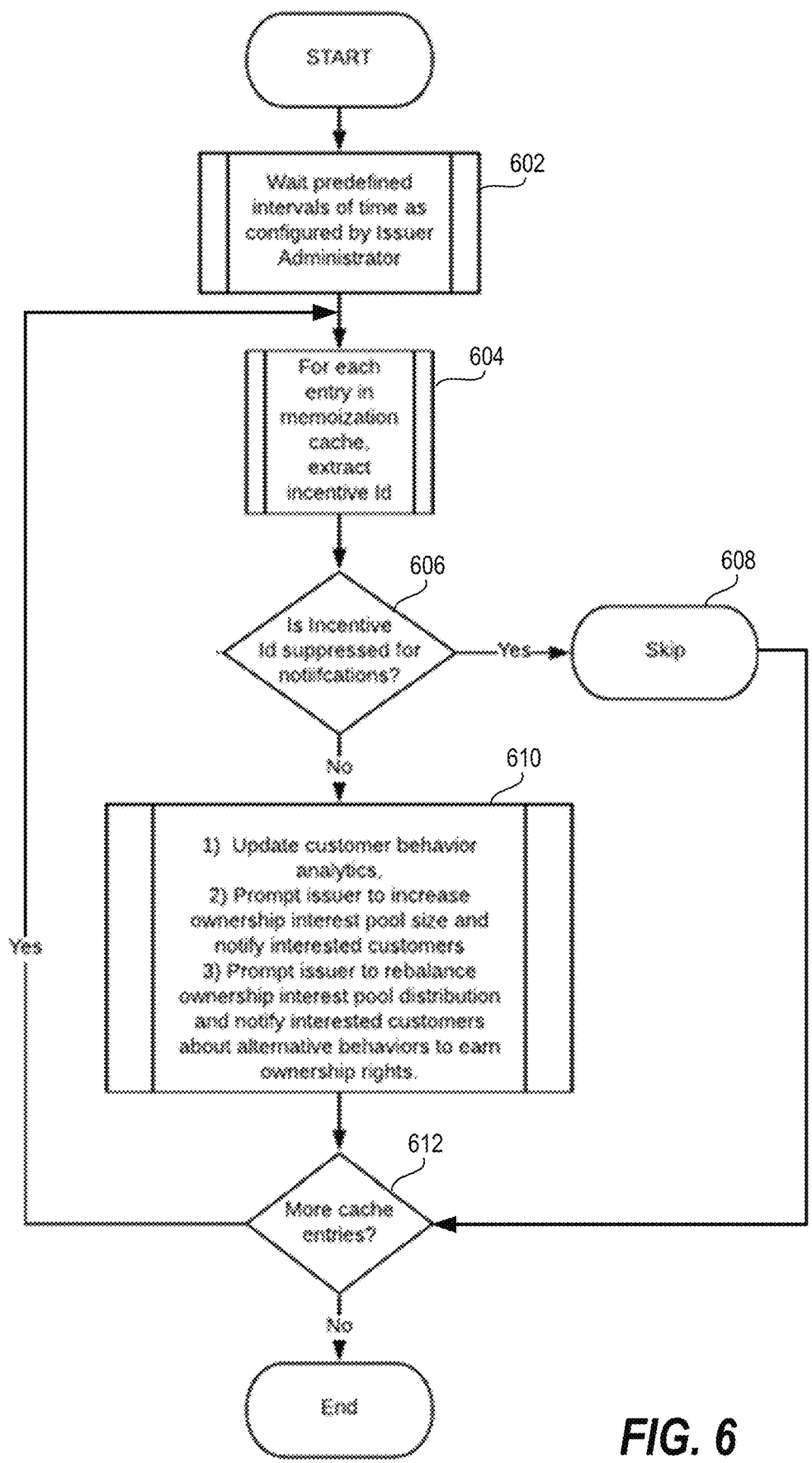
FIG. 6 is a high level flow diagram used to describe steps of a method, according to an embodiment of the present technology, performed by a notification server introduced in the discussion of FIG. 1.

As noted above, the behavior scoring server 106 deduplicates and compiles meaningful insights for end users and for an OI issuer administrator and provides it to the notification server 104, which processes are represented by the arrowed line labeled 9 in FIG. 1. More specifically, behavior scores that are determined by the behavior scoring server 106 are provided to the notification server 104, which enables the notification server 104 to provide notifications about insights that are subscribed to by an issuer administrator and end users via the OI issuer administration application server 112, which processes are represented by the arrowed line labeled 10 in FIG. 1. FIG. 6 will now be used to describe how the notification server 104 can provide notifications that are sent to the OI issuer administration application server 112, in accordance with certain embodiments of the present technology.

Referring to FIG. 6, as indicated at step 602, the notification server 104 will periodically perform the process described with reference to FIG. 6. The predefined intervals at which this process is performed can be a default interval, or an interval that is specified by an administrator for an OI issuer company. Exemplary intervals are an hour, day, week, or the like, but are not limited thereto.

At step 604, for an entry in a memoization cache, an incentive ID is extracted. An example of such a memoization cache is the incentive ID cache 400 discussed above with reference to FIG. 4A.

It is possible that an administrator only wants to receive notifications for certain types of incentives, and not receive notifications for other types of incentives. To achieve such selective notifications, an administrator can be given the ability to suppress notifications for certain incentive IDs. In order to not waste resources of the notification server 104, the notification server may skip performing analytics and generating notifications, and/or the like, for incentive IDs for which notifications are suppressed, as can be appreciated from steps 606 and 608 in FIG. 6. More specially, at step 606 there is a determination of whether an incentive ID has been suppressed for notifications. If the answer to step 606 is yes, then flow goes to step 608, which indicates that analytics of data associated with the incentive ID are skipped, as are the generation of notifications based thereon. Flow then goes to step 612 to determine whether there is another incentive ID in the cache entry for which analytics and notifications may be generated.

If the answer to the determination at step 606 is no, meaning the incentive ID is not suppressed, then flow goes to step 610. At step 610 the notification server 104 can perform various types of analytics, and/or generate various types of notifications that can be provided to an OI issuer. For example, at step 610 customer behavior analytics can be updated, e.g., based on updated behavior scores provided to the notification server 104 by the behavior scoring server 106. Further, at step 610 a notification can be sent to an OI issuer to inform the OI issuer that an OI pool is empty, or nearly depleted, to thereby prompt the OI issuer to refill or increase the size of an OI pool. A notification may also provide an OI issuer with an indication of how many end users, and/or which end users, are interested in OIs from an OI pool that is already depleted, thereby providing an administrator of an OI issuer with information that can be used to determine whether or not to refill or increase the size of an OI pool. Alternative and/or additional notifications can be generated at step 610. The analytics and notifications performed and produced at step 610 can be based on data stored in the incentive ID cache (e.g., 400 in FIG. 4A). Alternatively, or additionally, the analytics and notifications performed and produced at step 610 can be based on data stored in a database (e.g., 110).

At step 612 there is a determination of whether there are any more cache entries (i.e., at least one cache entries in the incentive ID cache 400) that still needs to be selected and analyzed, if not suppressed. If the answer to the determination is yes, the flow returns to step 604. If the answer to the determination at step 612 is no, then the process described with reference to FIG. 6 is completed until the next interval of time after which the steps are repeated.

In accordance with certain embodiments of the present technology, ownership interests (OIs) are determined and updated in real or near-real time for customers (a.k.a. end users). Specific techniques for performing such determinations and updates are described below.

Certain embodiments of the present technology, described herein, enable automated real-time defining and managing of whom an ownership interest (OI) is assigned to, under what circumstances it is granted, and the conditions under which it resolves into full ownership. This provides a programmatic way to create and adjust ownership interest and the conditions that must be fulfilled for the benefit of an incentive to be captured, and also provides for monitoring dynamically whether the conditions for satisfying the conditions have been met. Further, real-time feedback to the end users encourages the incentivized behaviors in order to earn ownership interests. Using this system, companies can provide positive incentive for specific actions that serve goals, targeted in a very specific and refined way. Analysis of the actions of the end users of the system, and the insights from this analysis can be automatically fed back into the system to improve the system. From analyzing the actions and grants that an end user has completed, it can be inferred what sort of customer they are, what sort of actions they engage in, and some of what their interests are. This in turn can be used to define the cohort or segment of users who could most effectively be a part of a particular campaign, including, e.g.: if they are part of a social circle which a company wishes to influence; if the interests of the end user overlap with the subject of the campaign, etc., thereby enabling automated determinations of whether an end user could become a primary or secondary target for being assigned grants within a share pool set aside for such a campaign.

Figures 7, 8:
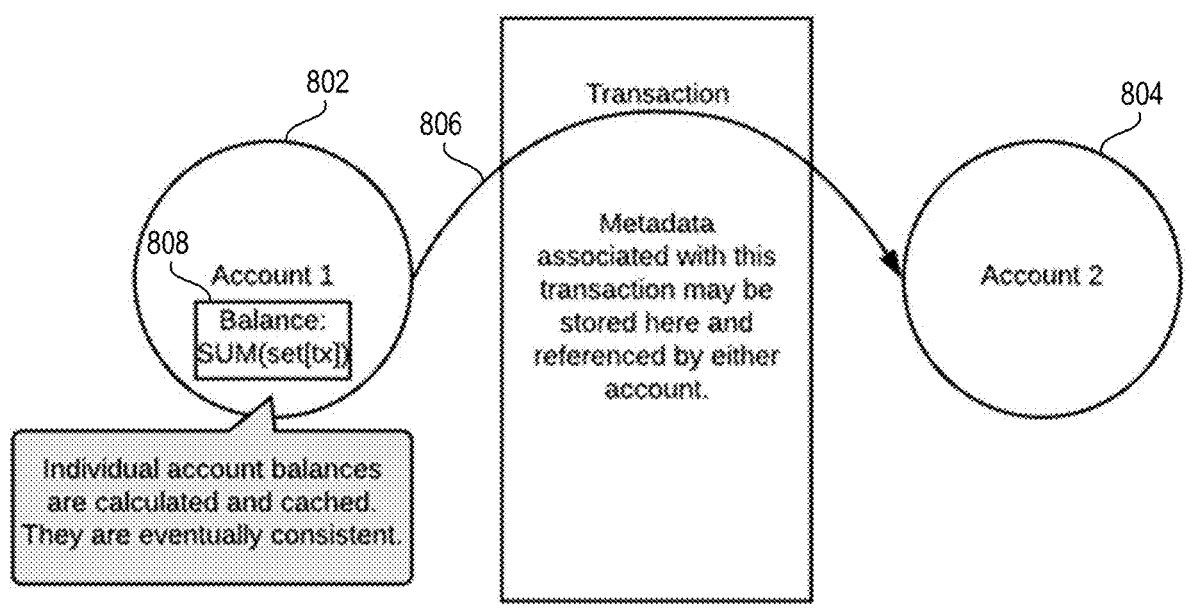
FIG. 7 shows an example table with which conventional double entry transactions can be performed, and is used to explain how the table (or at least two rows thereof) needs to be locked to ensure the validity of conventional double entry transactions performed one after the other in a serial manner.
FIG. 8 pictorially illustrates directed graph transaction processing according to certain embodiments of the present technology.

As was described above, in response to end users performing certain actions, the end users can be granted ownership interests (OIs), a.k.a., securities or assets, in a company that has offered grants of OIs from an OI pool. An OI pool can correspond to a first account (e.g., Account 1), and end users can each correspond to their own respective account, e.g., Account 2, Account 3, etc. Such information is conventionally stored in tables that are selectively locked during a transaction. A simple example of such a table is shown in FIG. 7. More specifically, FIG. 7 shows a table 700 that includes columns 702 and 704. The column 702 is used to store Account IDs, and the column 704 is used to store amounts of ownership interests (OIs). The table 700 is shown as includes rows $706_1, 706_2, 706_3, \ldots 706_N$, which rows can be collectively referred to as the rows 706, or can be individually referred to as a row 706. The row $706_1$ corresponds to how many OIs are in a OI pool, the row $706_2$ corresponds to how many OIs have been granted to end user 1, the row $706_3$, corresponds to how many OIs have been granted to end user 2, etc. The table 700 can be stored in a database, or some other type of data store.

As was described above, in accordance with certain embodiments described herein, one or more OIs may be granted from an OI pool (a.k.a., a securities pool) to the end user 1 in response to the end user 1 performing an action, and one or more further OIs may be granted (from the OI pool) to the end user 2 in response to the end user 2 performing an action. Each transfer of ownership, e.g., from an OI pool to an end user, can be referred to as a transaction. Validity of a transaction is based on whether there is availability in the source account to complete the transaction. For example, in order for there to be a valid transfer of 70 OIs from the OI pool to the end user 1, there must be at least 70 OIs in the OI pool (e.g., Account 1). This requires knowing the balance of an account at a particular point in time.

When performing a transaction, a debit to one account (e.g., Account 1) needs to equal a credit to another account (e.g., Account 2). Conventionally, the matching of credits and debits is not always guaranteed accurate unless a table storing the account information is locked. In other words, conventionally, when OIs (a.k.a., securities) are transferred from one account to another account, the table that stores the balances within the various accounts needs to be locked during such a transaction. For example, while a transfer is being performed from Account 1 to Account 2, the table 700 is locked. This way when the next transaction is performed, e.g., a transfer from Account 1 to Account 3, it will be known whether there is enough of a balance within Account 1 to perform the next transaction. Either the entire table 700 can be locked, or just the two rows associated with the transaction are locked. It is the use of a double-entry accounting system that necessitates the locking of at least two rows of the table 700, wherein double-entry accounting requires that every entry to an account (which entry is either a debit or credit) corresponding to a row in a table requires a corresponding and opposite entry (i.e., a credit or a debit) to a different account corresponding to a different row in the table.

Where a majority of the transactions are going to involve a common row, such as the row $706_1$ in FIG. 7, a next transaction that will involve a locked row must wait until the row is no longer locked before the transaction can be performed. Where numerous transactions occur in a short frame of time, constantly locking the table 700, or at least rows thereof, may cause the transactions to take an unacceptable amount of time to complete. Whenever a transaction is to occur, it is important to provide an indication (e.g., a yes or no response) of whether the transaction is valid with minimal latency and table locking. A valid transaction is one that is capable of being completed. A transaction that cannot be completed, e.g., because of insufficient assets in a source account, is considered an invalid transaction.

In accordance with certain embodiments of the present technology, data is stored within a database or other data store in a manner that does not follow conventional double-entry accounting rules. More specifically, the data is stored in such a manner that multiple rows of a table (e.g., the table 700) need not be locked when a transaction is being performed. Such embodiments utilized a directed graph approach, and thus, can be referred to as directed graph transaction processing. More specifically, in such embodiments, accounts are represented by nodes of a directed graph, wherein a directed graph includes a set of nodes (corresponding to accounts) that are connected together by links (also referred to as edges) in a specific direction. In such embodiments, the edges (a.k.a. links) between nodes (corresponding to accounts) specify which account is being debited and which account is being credited.

FIG. 8 illustrates how directed graph transaction processing can be pictorially represented. FIG. 9 shows an example pending transaction queue 900, and illustrates how directed graph transaction processing can be represented by tabular relational data in a relational database system. Referring first to FIG. 8, shown therein is a node 802 corresponding to a first account (Account 1) and a node 804 corresponding to a second account (Account 2). Also shown in FIG. 8 is a link (a.k.a. an edge) represented by the arrowed line labeled 806. Since the arrowed line 806 is pointing from the node 802 to the node 804 this indicates that the transaction is a transfer of one or more OIs from Account 1 (corresponding to node 802) to Account 2 (corresponding to node 804). For this example, assume that the transfer is of 500 ownership interests. In FIG. 8, the block 808 is representative of an entry in a balance cache, wherein such a balance cache can have a separate entry for each node (i.e., account).

As noted above, FIG. 9 shows an example pending transaction queue 900, and illustrates how directed graph transaction processing can be represented by tabular relational data in a relational database system. Referring first to FIG. 9, the pending transaction queue 900 is shown as including a Transaction ID column 902, a Source Account column 904, a Destination Account column 906, an Amount column 908, and a Metadata column 910. Each of the rows $912_1, 912_2, 912_3 \ldots$ corresponds to a different pending transaction in the queue, which rows can be collectively referred to as the rows 912, or can be individually referred to as a row 912. Within the row $912_1$ is data corresponding to a transfer from Account 1 to Account 2 of 500 OIs (a.k.a. securities) as an unconditional grant. Within the row $912_2$ is data corresponding to a transfer from Account 1 to Account 3 of 200 OIs (a.k.a. securities) as a conditional grant. The pending transaction queue 900 can be in memory of a computer system, or in a database (e.g., 110), depending upon implementation.

Figure 11A:
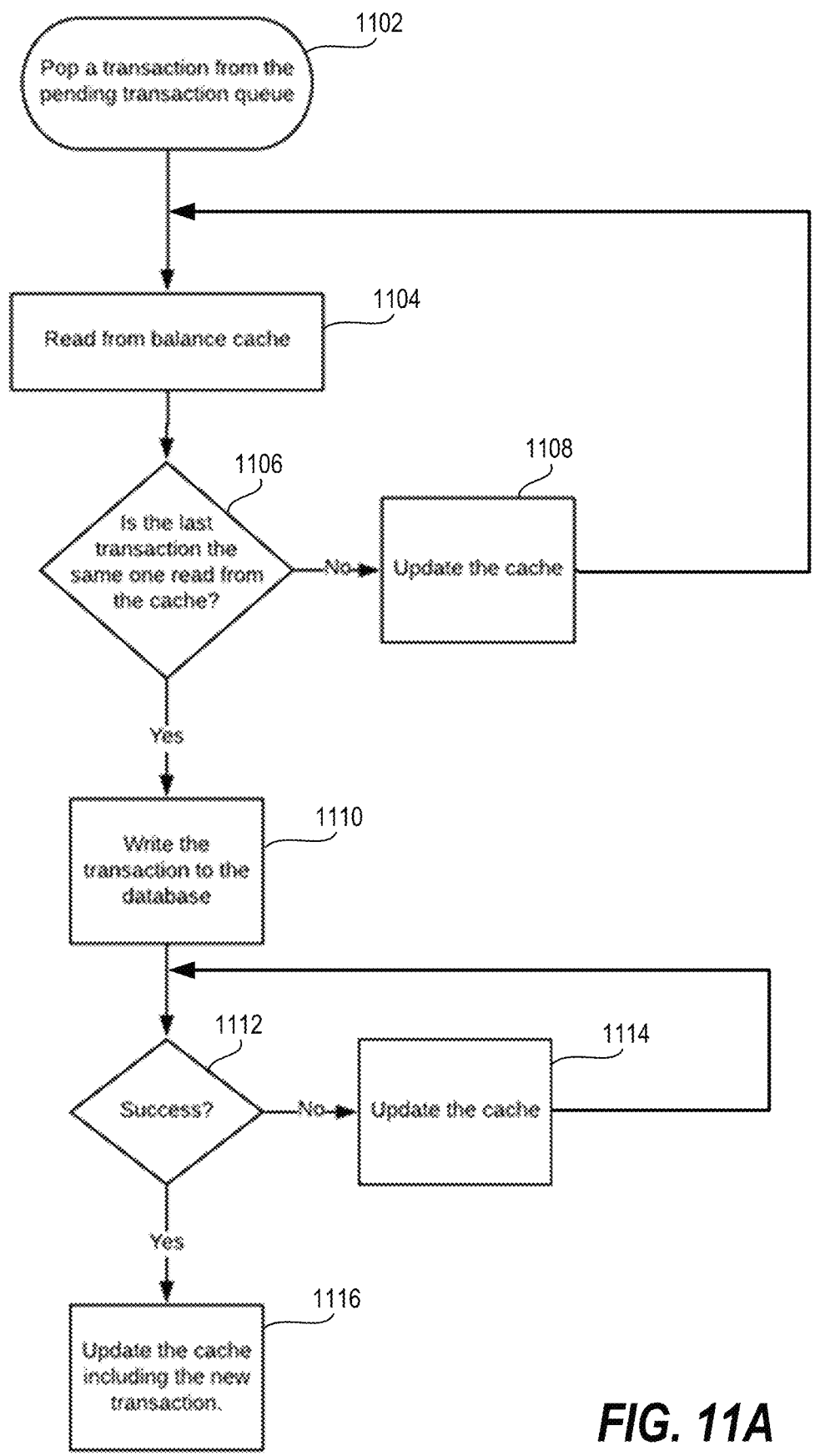
FIG. 11A is a high level flow diagram that is used to describe how the balance cache shown in FIG. 10 can be utilized, in accordance with certain embodiments of the present technology.

FIG. 10 shows an example balance cache 1000, which is used to quickly update and provide access to node (i.e., account) balances in a low latency and computationally efficient manner. Referring to FIG. 10, the balance cache is shown as including a node (i.e., account) column 1002, a balance (i.e., running tab) column 1004, and a transaction ID column 1006 in which is stored the transaction ID of the last transaction that was used to calculate the balance. Each of the rows 10081, 10082, 10083, 10084, etc., corresponds to a separate cache entry. The rows 10081, 10082, 10083, 10084, etc. can be referred to collectively as the rows 1008 or balance cache entries 1008, or individually as a row 1008 or balance cache entry 1008. For each balance cache entry 1008, the balance (i.e., running tab) in column 1004 is updated whenever a pending transaction from a pending transaction queue (e.g., 900 in FIG. 9) is processed and completed, and the transaction ID (of the last transaction from which the balance was calculated) in column 6 is updated. FIG. 11A is a high level flow diagram that is used to described how the balance cache shown in FIG. 10 can be utilized, in accordance with certain embodiments of the present technology.

Referring to FIG. 11A, the oval 1102 specified that a transaction is popped (and more generally obtained or read) from a pending transaction queue. An example of such a pending transaction queue 900 is shown in FIG. 9, which was discussed above. At step 1104 a balance cache (e.g., 1000 in FIG. 10) is read. At step 1106 there is a determination whether the last transaction performed is the same as the last transaction performed as read from the balance cache at step 1104. In other words, step 1106 is performed to determine whether the balance cache is fully updated. If the answer to the determination at step 1106 is no, then flow goes to step 1108. At step 1108 the balance cache is updated. Exemplar details of how the balance cache can be updated at step 1108 are described below with reference to FIG. 11B. If the answer to the determination at step 1106 is yes, then flow goes to step 1110. It is possible that multiple instances of steps 1104, 1106, and 1108 may occur, in a loop, before the answer to the determination at step 1106 is yes and flow goes to step 1110.

At step 1110 transaction data is written to a database (e.g., 110), such that the data is available at a later time for analysis, if desired. At step 1112 there is a determination of whether the transaction data was successfully written to the database. If the answer to the determination at step 1112 is no, then flow goes to step 1114 and the balance cache is updated, and flow returns to step 1112. If the answer to the determination at step 1112 is yes, then flow goes to step 1116. At step 1116 the balance cache is updated such that it includes the transaction that was popped from the pending transaction queue at the most recent instance of step 1102. Thereafter, flow can return to step 1102 so that the next pending transaction in the pending transaction queue can be popped from the queue and used to further update the balance cache, etc.

Figure 11B:
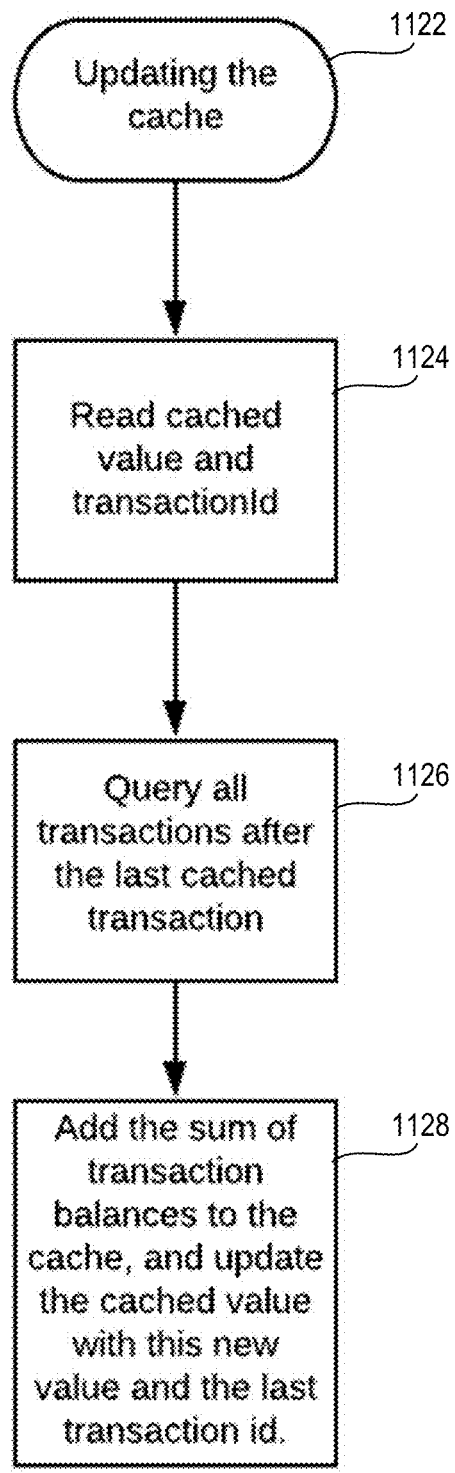
FIG. 11B is a high level flow diagram that is used to described additional details of some of the steps of the flow diagram in FIG. 11A.

FIG. 11B is a high level flow diagram that is used to describe additional details of some of the steps of the flow diagram in FIG. 11A. More specifically, the flow diagram in FIG. 11B is used to described how the balance queue can be updated at step 1108, 1114, or 1116, as specified by the oval 1122. The steps of the flow diagram in FIG. 11B can be performed for each cache entry (e.g., 1008) in the balance cache (e.g., 1000). At step 1124, a cached balance value (i.e., running tab) is read (e.g., from column 1004) and transaction ID (of the last traction from which the balance was calculated) is read (e.g., from column 1006) from the balance cache (e.g., 1000). Step 1126 involves querying all transactions after the last cached transaction. Step 1128 involves adding the sum of transaction balance to the balance cache, and updating the cached balance value (i.e., running tab) with this new value and updating the last transaction information with the last transaction ID.

Figure 12:
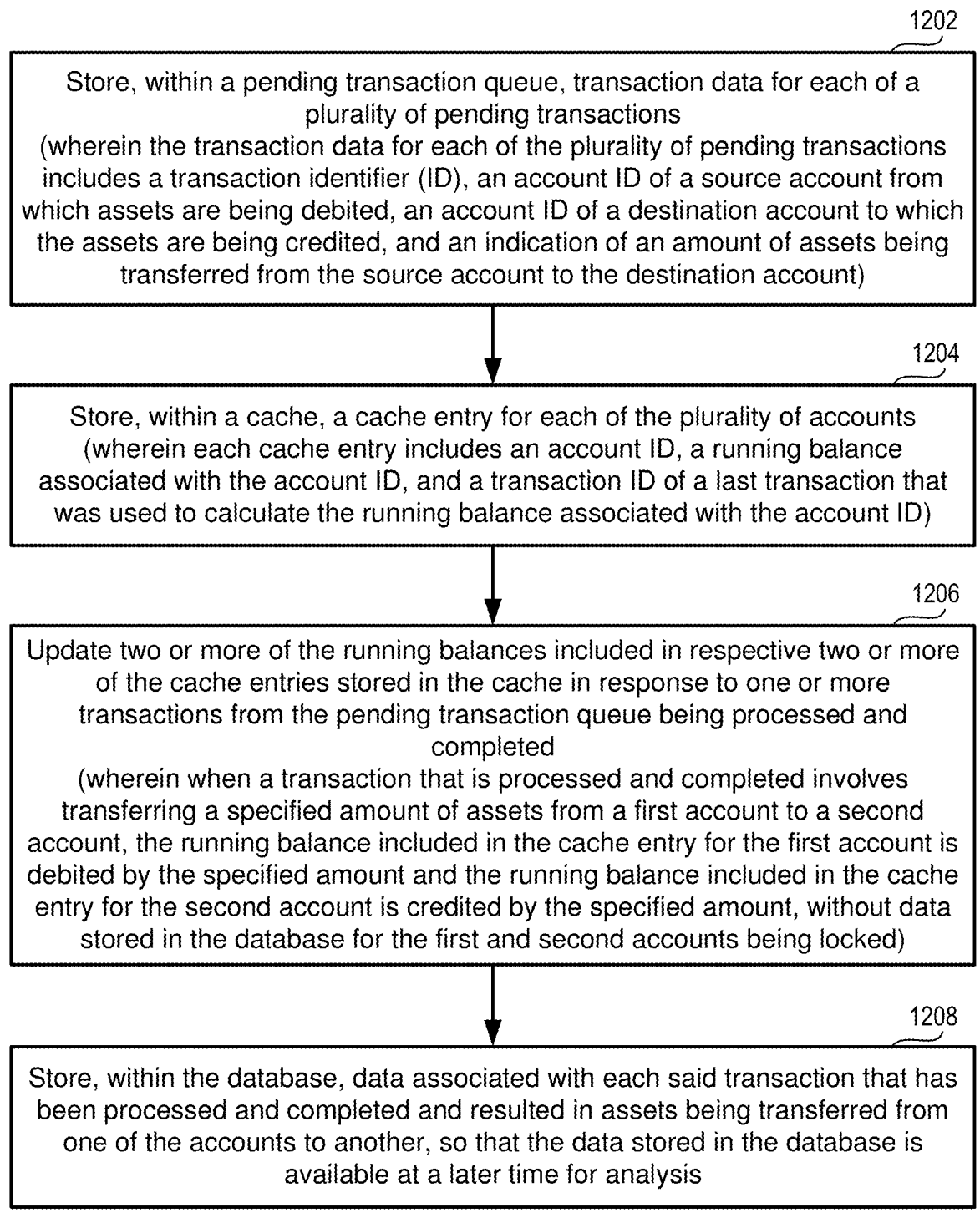
FIG. 12 is a high level flow diagram used to describe steps of a method, according to an embodiment of the present technology, that can be used to update balances in each of a plurality of different accounts without needing to access and lock portions of a database within which data for each of a plurality of processed transactions is stored.

FIG. 12 is a high level flow diagram used to describe steps of a method, according to an embodiment of the present technology, that can be used to update balances in each of a plurality of different accounts without needing to access a database within which data for each of a plurality of processed transactions is stored. In other words, the flow diagram of FIG. 12 explains a method for using the pending transaction queue 900 and the balance cache 1000 which were described above with reference to FIGS. 9 and 10.

Referring to FIG. 12, step 1202 involves storing, within a pending transaction queue (e.g., 900 in FIG. 9), transaction data for each of a plurality of pending transactions. In certain such embodiments, the transaction data for each of the plurality of pending transactions includes a transaction identifier (ID), an account ID of a source account from which assets are being debited, an account ID of a destination account to which the assets are being credited, and an indication of an amount of assets being transferred from the source account to the destination account.

Still referring to FIG. 12, step 1204 involves storing, within a cache, a cache entry for each of the plurality of accounts, wherein each cache entry includes an account ID, a running balance associated with the account ID, and a transaction ID of a last transaction that was used to calculate the running balance associated with the account ID. The balance cache 1000, described above with reference to FIG. 10, is an example of the cache referred to in step 1204.

Step 1206 involves updating two or more of the running balances included in respective two or more of the cache entries (e.g., 1008) stored in the cache (e.g., 1000) in response to one or more transactions from the pending transaction queue (e.g., 900) being processed and completed. At step 1206, when a transaction that is processed and completed involves transferring a specified amount of assets from a first account to a second account, the running balance included in the cache entry for the first account is debited by the specified amount and the running balance included in the cache entry for the second account is credited by the specified amount, without data stored in the database for the first and second accounts being locked.

Step 1208 involves storing, within a database (e.g., 110), data associated with each transaction that has been processed and completed and resulted in assets being transferred from one of the accounts to another, so that the data stored in the database is available at a later time for analysis.

As can be appreciated from the above discussion of FIGS. 9, 10, 11A, and 11B, running balances and transaction IDs can be repeatedly updated as the balance cache (e.g., 1000) is brought up to date and as additional transactions from the pending transaction queue (e.g., 900) are processed. During this method there are instances where a transaction (for which transaction data was stored in the pending transaction queue) is not completed, e.g., when the transaction data specifies that an amount of assets to be transferred from a source account to a destination account is less than the running balance included in the cache entry associated with the account ID of the source account. In such an instance, it is still useful to store, within the database, data associated with the transaction that was not completed, so that the data associated with the transaction that was not completed is available at a later time for analysis. As can be appreciated from the above discussion, the running balances included in the cache entries of the balance cache (e.g., 1000) can be used to determine whether or not to complete additional pending transactions for which transaction data is stored in the pending transaction queue (e.g., 900).

Certain embodiments of the present technology provide a visual interface that visualizes to end users the potential value of ownership interests issued through the computer system 100, which can be helpful to utilizing the OIs as an incentive mechanism. To this end, there can be an interface where a company administrator can tune a projected future value of the assets and how it is displayed to the end user. Value, in the simplest form, is simply described as total company valuation divided by the total number of shares, $$\frac{\text{Valuation}}{\text{Total Shares}}.$$

In the case where the vehicle of the ownership interest is itself a partial owner in the company described, the total ownership percentage of the vehicle is multiplied by the company valuation to find the valuation of the unitized ownership interest. An administrator can specify the initial percentage of company ownership that the vehicle possesses, and then specify desired amounts of ownership after a specified time period, e.g. 5 years, 10 years, or 15 years. In order to arrive at a meaningful story around value projections it helps to create multiple projected company valuation after several specified numbers of years. On one hand there can be a projection if the company is worth for instance $100 million after 15 years. On the other hand if that company is worth $1 billion after 15 years. In order to arrive at fine-grained valuations for any point in time up to the projected number of years, a compound annual growth rate formula can be used, after finding the growth rate that will reach the projected valuation at the specified time. Any point along that time curve can then be calculated, showing how much the shares could be worth after five years, seven years, etc.

Certain embodiments of the present technology can be used to define and manage in real-time in a dynamic and automatic way, whom OIs are assigned to, under what circumstances OIs are granted, and the conditions under which OIs resolve into full ownership. This is a programmatic way to create and adjust ownership interest and the conditions that must be fulfilled for the benefit of this incentive to be captured, monitoring dynamically whether the conditions for satisfying the conditions have been met. Real-time feedback to the end user encourages the incentivized behaviors in order to earn ownership interest.

Using such embodiments, companies can provide positive incentives for specific actions that serve their goals, targeted in a very specific and refined way. Analysis of the actions of the end users of the system, and the insights from this analysis can be fed back into the granting system. From analyzing the actions and grants an end user has completed, it can be inferred what sort of customer they are, what sort of actions they engage in, and some of what their interests are. This in turn can be used to define the cohort or segment of users who will most effectively be a part of a particular campaign: if they are part of a social circle which the company wishes to influence, if the interests of the user overlap with the subject of the campaign, etc., they could become a primary or secondary target for being assigned grants within a share pool set aside for such a campaign.

Certain embodiments of the present technology can be used to dynamically manage conditional ownership interests and update ownership status in real-time to the end user to encourage the incentivized behaviors. More specifically, such embodiments can be used to provide dynamic and real-time rebalancing of categorized ownership interest pools. In accordance with an embodiment, to begin using the system 100, an OI issuing company can assign shares or ownership interest legally to the company running the transaction servers to generate an initial Ownership Interest Pool. To set aside a specific amount of ownership interest towards a particular campaign or set of behaviors, the OI issuer may create a sub-pool, transferring some quantity of ownership interest from the parent pool. Permissions to make grants from that Ownership Interest Pool may be delegated to partner companies for joint campaigns. Upon successful fulfillment of the conditions defined in a conditional grant, the ownership interest represented in the grant becomes unconditionally owned by the grant recipient. Conditions include expiration time for an ownership grant, a maximum number of grants for a single action, a validity period measured from a previous action, etc. If a conditional grant expires or is canceled before the conditions are met, the ownership interest in the grant flows back into the parent/issuing ownership interest pool. A conditional or unconditional grant may be made only when there is enough ownership interest in the source share pool.

Certain embodiments of the present technology utilize incentives and ownership interests to drive behavior. For example, the goal could be to use customer (a.k.a., end user) behavior to increase the awareness of or value of a specific service or product. Companies can initially grant a set of securities to drive specific behavior. Those securities are tied to a set of tasks and deadlines for performing those tasks. Examples of tasks include testing a beta version of a product or service; downloading an application; installing an application; registering a product or service; encouraging friends to use a product of service; and continued use of a product (e.g., making a purchase, becoming a member, depositing money, transferring value to a friend, etc.). Initially, the customer would not own the securities underlying the grant but would earn the securities over time by engaging in the behavior that allows the customer (aka user) to earn the underlying equity. If the customer fails to engage in the task by the deadline, those securities will decay and be returned to the pool. Concurrently, the customer's behavior is monitored. Based on that behavior, additional sets of incentivized actions (a.k.a., tasks) tasks can be assigned and/or adjusted.

There are multiple technical problems that embodiments of the present technology overcome to implement a dynamic and real-time rebalancing of grants to achieve maximum effect. Such technical problems in part relate to conventional computer systems not being able to satisfactorily handle the transaction frequency to be able to categorize and rebalance in real-time. Certain embodiments take advantage of a priori knowledge of the usage patterns for the different parts of the system to enable the usage patterns to be tracked and enable a continuous rebalance of grant allocations to achieve an optimal allocation of ownership interest.

In certain embodiments of the present technology described above, memoization and deduplication techniques are used to handle the high transaction frequency. Further, a continuous behavioral scoring algorithm enables OI issuers to either manually or automatically rebalance the weights assigned to the categories that draw from an ownership interest pool. This enable a ready set of customer interests to be provided to issuer/sponsor company to analyze customer behavior, engage with interested customers demonstrating specific behaviors, launch new campaigns, etc.

In accordance with certain embodiments, allocation of ownership interest resources is mediated via the behavior score, i.e. the weighting of company-defined categories of behavior. Companies may manually change the weighting of various actions and how they alter the behavior score, as well as how the behavior score alters the conditions and quantities of the grants offered to end users. Changing the rewards (grants) globally for an action will attract more users to perform that action, but incentivizing via a targeted behavior score offers the unique ability to know whom to incentivize.

In accordance with certain embodiments, behavioral scores for customers can be released without releasing underlying details of financial data. Shared and dedicated incentive pools for business partners can be used to reward specific behaviors by being given access to one or more behavior scores. Further, users can choose to release their behavior score without releasing financial information, which protects user privacy while getting incentivized in a way that benefits them and the partner companies. Partner companies can feed in their own raw data and receive a score combined with other data models in the system for the user profiles as authorized by a user.

According to one aspect of the present disclosure, a computer system comprises one or more processors, memory within which a cache is stored, and a database. The one or more processors is/are configured to store, within a pending transaction queue, transaction data for each of a plurality of pending transactions, wherein the transaction data for each of the plurality of pending transactions includes a transaction identifier (ID), an account ID of a source account from which assets are being debited, an account ID of a destination account to which the assets are being credited, and an indication of an amount of assets being transferred from the source account to the destination account. The one or more processor is/are also configured to store, within a cache, a cache entry for each of the plurality of accounts, wherein each cache entry includes an account ID, a running balance associated with the account ID, and a transaction ID of a last transaction that was used to calculate the running balance associated with the account ID. The one or more processor is/are also configured to update two or more of the running balances included in respective two or more of the cache entries stored in the cache in response to one or more transactions from the pending transaction queue being processed and completed, wherein when a said transaction that is processed and completed involves transferring a specified amount of assets from a first account to a second account, the running balance included in the cache entry for the first account is debited by the specified amount and the running balance included in the cache entry for the second account is credited by the specified amount, without data stored in the database for the first and second accounts being locked. The one or more processor is/are also configured to store, within the database, data associated with each said transaction that has been processed and completed and resulted in assets being transferred from one of the accounts to another, so that the data stored in the database is available at a later time for analysis.

Optionally, in any of the preceding aspects, the one or more processors is/are also configured to: not complete a said transaction, for which transaction data was stored in the pending transaction queue, when the transaction data specifies that an amount of assets to be transferred from a source account to a destination account is less than the running balance included in the cache entry associated with the account ID of the source account; and store, within the database, data associated with the said transaction that was not completed, so that the data associated with the said transaction that was not completed is available at a later time for analysis.

Optionally, in any of the preceding aspects, the one or more processors is/are also configured to use the running balances included in the cache entries to determine whether or not to complete additional pending transactions for which transaction data is stored in the pending transaction queue.

Optionally, in any of the preceding aspects, the one or more processors are further configured to: store, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs; store, in the cache, of a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1; extract one of the IDs from a transaction request that was processed and completed by at least one of the one or more processors of the computer system; update a respective value of at least one of the n-elements included in the n-tuple value of the KVP stored in the cache for the one of the IDs extracted from the transaction request that was processed and completed, to thereby update analytics associated with the one of the IDs without requiring that a query be run against the database; and store, in the database, transaction data for the transaction request that was processed and completed so that the transaction data is available at a later time for further analytics to be performed for the one of the IDs, if desired, by running a query against the database.

Optionally, in any of the preceding aspects, the one or more processors are further configured to: extract a further one of the IDs from a further transaction request that was processed and not completed by at least one of the one or more processors of the computer system; update a respective value of at least one of the n-elements included in the n-tuple value of the KVP stored in the cache for the further one of the IDs extracted from the further transaction request that was processed and not completed, to thereby update analytics associated with the further one of the IDs without requiring that a query be run against the database; and store, in the database, further transaction data for the further transaction request that was processed and not completed so that the further transaction data is available at a later time for further analytics to be performed for the further one of the IDs, if desired, by running a query against the database.

Optionally, in any of the preceding aspects, each of the IDs for which analytics are to be tracked comprises an incentive ID associated with a campaign for which analytics are to be tracked; the cache comprises an incentive ID cache; the KVPs stored in the incentive ID cache enable analytics associated with the campaign to be updated in real or near-real time without requiring that a query be run against the database; the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

Optionally, in any of the preceding aspects, the transaction request that was processed and completed was issued in response to one of a plurality of predetermined actions being performed by an entity associated with an account, wherein each of the predetermined actions has a respective weight for each of a plurality of categories, and wherein the one or more processors are further configured to: calculate a behavior score for the entity that performed the one of the plurality of predetermined actions by producing a vector of weights, with each of the weights being associated with a different one of the categories; and adjust which or to what extent specific ones of the actions are incentivized based on the calculated behavior score.

Optionally, in any of the preceding aspects, the one or more processors are further configured to: calculate a respective behavior score for each of the plurality of the categories by calculating a respective a weighted average of a plurality of actions performed by a plurality of entities over each of the categories; and adjust one or more campaigns based on results of the calculating the behavior scores for the plurality of categories.

According to one aspect of the present disclosure, a method is for used by a computer system that includes one or more processors, a database, and a cache, where the method is for updating balances in each of a plurality of different accounts without needing to access the database within which data for each of a plurality of processed transactions is stored, the method comprising: storing, within a pending transaction queue, transaction data for each of a plurality of pending transactions, wherein the transaction data for each of the plurality of pending transactions includes a transaction identifier (ID), an account ID of a source account from which assets are being debited, an account ID of a destination account to which the assets are being credited, and an indication of an amount of assets being transferred from the source account to the destination account; storing, within a cache, a cache entry for each of the plurality of accounts, wherein each cache entry includes an account ID, a running balance associated with the account ID, and a transaction ID of a last transaction that was used to calculate the running balance associated with the account ID; updating two or more of the running balances included in respective two or more of the cache entries stored in the cache in response to one or more transactions from the pending transaction queue being processed and completed, wherein when a said transaction that is processed and completed involves transferring a specified amount of assets from a first account to a second account, the running balance included in the cache entry for the first account is debited by the specified amount and the running balance included in the cache entry for the second account is credited by the specified amount, without data stored in the database for the first and second accounts being locked; and storing, within the database, data associated with each said transaction that has been processed and completed and resulted in assets being transferred from one of the accounts to another, so that the data stored in the database is available at a later time for analysis.

Optionally, in any of the preceding aspects, the method further comprises: not completing a said transaction, for which transaction data was stored in the pending transaction queue, when the transaction data specifies that an amount of assets to be transferred from a source account to a destination account is less than the running balance included in the cache entry associated with the account ID of the source account; and storing, within the database, data associated with the said transaction that was not completed, so that the data associated with the said transaction that was not completed is available at a later time for analysis.

Optionally, in any of the preceding aspects, the method further comprises using the running balances included in the cache entries to determine whether or not to complete additional pending transactions for which transaction data is stored in the pending transaction queue.

Optionally, in any of the preceding aspects, the method further comprises one or more processors: storing, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs; storing, in the cache, of a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1; extracting one of the IDs from a transaction request that was processed and completed by at least one of the one or more processors of the computer system; updating a respective value of at least one of the n-elements included in the n-tuple value of the KVP stored in the cache for the one of the IDs extracted from the transaction request that was processed and completed, to thereby update analytics associated with the one of the IDs without requiring that a query be run against the database; and storing, in the database, transaction data for the transaction request that was processed and completed so that the transaction data is available at a later time for further analytics to be performed for the one of the IDs, if desired, by running a query against the database.

Optionally, in any of the preceding aspects, the method further comprises one or more processors: extracting a further one of the IDs from a further transaction request that was processed and not completed by at least one of the one or more processors of the computer system; updating a respective value of at least one of the n-elements included in the n-tuple value of the KVP stored in the cache for the further one of the IDs extracted from the further transaction request that was processed and not completed, to thereby update analytics associated with the further one of the IDs without requiring that a query be run against the database; and storing, in the database, further transaction data for the further transaction request that was processed and not completed so that the further transaction data is available at a later time for further analytics to be performed for the further one of the IDs, if desired, by running a query against the database.

Optionally, in any of the preceding aspects, each of the IDs for which analytics are to be tracked comprises an incentive ID associated with a campaign for which analytics are to be tracked; the cache comprises an incentive ID cache; the storing the KVPs in the incentive ID cache enables analytics associated with the campaign to be updated in real or near-real time without requiring that a query be run against the database; the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

Optionally, in any of the preceding aspects, the transaction request that was processed and completed was issued in response to one of a plurality of predetermined actions being performed by an entity associated with an account, each of the predetermined actions having a respective weight for each of a plurality of categories, and the method further comprises the one or more processors: calculating a behavior score for the entity that performed the one of the plurality of predetermined actions by producing a vector of weights, with each of the weights being associated with a different one of the categories; and adjusting which or to what extent specific ones of the actions are incentivized based on the calculated behavior score.

Optionally, in any of the preceding aspects, the method further comprises one or more processors: calculating a respective behavior score for each of the plurality of the categories by calculating a respective a weighted average of a plurality of actions performed by a plurality of entities over each of the categories; and adjusting one or more campaigns based on results of the calculating the behavior scores for the plurality of categories.

According to one aspect of the present disclosure, a computer system comprises one or more processors, memory within which a cache is stored, and a database. The one or more processors is/are configured to: store, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs; store, in the cache, of a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1; extract one of the IDs from a transaction request that was processed and completed by at least one of the one or more processors of the computer system; update a respective value of at least one of the n-elements included in the n-tuple value of the KVP stored in the cache for the one of the IDs extracted from the transaction request that was processed and completed, to thereby update analytics associated with the one of the IDs without requiring that a query be run against the database; and store, in the database, transaction data for the transaction request that was processed and completed so that the transaction data is available at a later time for further analytics to be performed for the one of the IDs, if desired, by running a query against the database.

Optionally, in any of the preceding aspects, the one or more processors are further configured to: extract a further one of the IDs from a further transaction request that was processed and not completed by at least one of the one or more processors of the computer system; update a respective value of at least one of the n-elements included in the n-tuple value of the KVP stored in the cache for the further one of the IDs extracted from the further transaction request that was processed and not completed, to thereby update analytics associated with the further one of the IDs without requiring that a query be run against the database; and store, in the database, further transaction data for the further transaction request that was processed and not completed so that the further transaction data is available at a later time for further analytics to be performed for the further one of the IDs, if desired, by running a query against the database.

Optionally, in any of the preceding aspects, each of the IDs for which analytics are to be tracked comprises an incentive ID associated with a campaign for which analytics are to be tracked; the cache comprises an incentive ID cache; the KVPs stored in the incentive ID cache enable analytics associated with the campaign to be updated in real or near-real time without requiring that a query be run against the database; the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

Optionally, in any of the preceding aspects, the transaction request that was processed and completed was issued in response to one of a plurality of predetermined actions being performed by an entity associated with an account, wherein each of the predetermined actions has a respective weight for each of a plurality of categories, and wherein the one or more processors are further configured to: calculate a behavior score for the entity that performed the one of the plurality of predetermined actions by producing a vector of weights, with each of the weights being associated with a different one of the categories; and adjust which or to what extent specific ones of the actions are incentivized based on the calculated behavior score.

Optionally, in any of the preceding aspects, the one or more processors are further configured to: calculate a respective behavior score for each of the plurality of the categories by calculating a respective a weighted average of a plurality of actions performed by a plurality of entities over each of the categories; and adjust one or more campaigns based on results of the calculating the behavior scores for the plurality of categories.

According to one aspect of the present disclosure, a method is for tracking and updating analytics associated with transactions performed by a computer system that includes one or more processors, a database, and a cache, the method comprising: storing, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs; storing, in the cache, of a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1; extracting one of the IDs from a transaction request that was processed and completed by at least one of the one or more processors of the computer system; updating a respective value of at least one of the n-elements included in the n-tuple value of the KVP stored in the cache for the one of the IDs extracted from the transaction request that was processed and completed, to thereby update analytics associated with the one of the IDs without requiring that a query be run against the database; and storing, in the database, transaction data for the transaction request that was processed and completed so that the transaction data is available at a later time for further analytics to be performed for the one of the IDs, if desired, by running a query against the database.

Optionally, in any of the preceding aspects, the method further comprises: extracting a further one of the IDs from a further transaction request that was processed and not completed by at least one of the one or more processors of the computer system; updating a respective value of at least one of the n-elements included in the n-tuple value of the KVP stored in the cache for the further one of the IDs extracted from the further transaction request that was processed and not completed, to thereby update analytics associated with the further one of the IDs without requiring that a query be run against the database; and storing, in the database, further transaction data for the further transaction request that was processed and not completed so that the further transaction data is available at a later time for further analytics to be performed for the further one of the IDs, if desired, by running a query against the database.

Optionally, in any of the preceding aspects, each of the IDs for which analytics are to be tracked comprises an incentive ID associated with a campaign for which analytics are to be tracked; the cache comprises an incentive ID cache; the storing the KVPs in the incentive ID cache enables analytics associated with the campaign to be updated in real or near-real time without requiring that a query be run against the database; the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

Optionally, in any of the preceding aspects, the transaction request that was processed and completed was issued in response to one of a plurality of predetermined actions being performed by an entity associated with an account, each of the predetermined actions having a respective weight for each of a plurality of categories, and further comprising the one or more processors: calculating a behavior score for the entity that performed the one of the plurality of predetermined actions by producing a vector of weights, with each of the weights being associated with a different one of the categories; and adjusting which or to what extent specific ones of the actions are incentivized based on the calculated behavior score.

Optionally, in any of the preceding aspects, the method further comprises the one or more processors: calculating a respective behavior score for each of the plurality of the categories by calculating a respective a weighted average of a plurality of actions performed by a plurality of entities over each of the categories; and adjusting one or more campaigns based on results of the calculating the behavior scores for the plurality of categories.

According to one aspect of the present disclosure, a computer implemented method for providing gamified asset ownership management, comprises: storing data that defines an asset pool, actions that trigger respective transactions request, and deadlines by which the actions are to be performed to trigger the respective transaction requests; monitoring for performance of the actions; in response to detecting that one of the actions has been performed by an end user within the respective deadline, issuing a respective transaction request to transfer one or more assets from the asset pool to an account of the end user that performed the one of the actions; processing and completing a transaction corresponding to the transaction request including debiting the asset pool and crediting the account of the end user that performed the one of the actions; updating a behavior score of at least the end user that performed the one of the actions, following the processing and completing of the transaction; and modifying the data that defines the asset pool and one or more of the actions that trigger respective transaction requests, following the processing and completing of the transaction.

Optionally, in any of the preceding aspects, the method further comprises: storing data that defines when a transferred asset, from the asset pool, is a vested asset or a conditional asset; after a conditional asset has been transferred to an account of an end user, monitoring for performance of a specific one of the actions that if performed by the end user by a respective deadline, would cause that conditional asset to be converted to a vested asset.

Optionally, in any of the preceding aspects, the method further comprises in response to determining that the specific one of the actions was not performed by the respective deadline, transferring the conditional asset from the account of the end user back to the asset pool.

Optionally, in any of the preceding aspects, the method further comprises: prior to the respective deadline for the specific one of the actions, providing a notification to a client device of the end user that warns the end user of the deadline and that the conditional asset will be transferred back to the asset pool if the specific one of the actions is not performed by the deadline.

According to one aspect of the present disclosure, a computer system comprises one or more processors and a data store. The one or more processors is/are configured to: store, within the data store, data that defines an asset pool, actions that trigger respective transactions request, and deadlines by which the actions are to be performed to trigger the respective transaction requests; monitor for performance of the actions; issue a respective transaction request to transfer one or more assets from the asset pool to an account of the end user that performed the one of the actions, in response to receiving an indication that one of the actions has been performed by an end user within the respective deadline; process and complete a transaction corresponding to the transaction request including debiting the asset pool and crediting the account of the end user that performed the one of the actions; update a behavior score of at least the end user that performed the one of the actions, following the processing and completing of the transaction; and modify the data that defines the asset pool and one or more of the actions that trigger respective transaction requests, following the processing and completing of the transaction.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For purposes of this document, a "computer" is a device for storing and/or processing data. A computer can include a desktop computer, a laptop computer, a server, a smartphone, a smart watch, a smart appliance, and any other machine that stores or processes data. Each computer can include one or more processors and memory. A computer can include a database and/or have access to a database.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A computer system, comprising:
one or more processors;
memory within which a cache is stored; and
a database;
the one or more processors configured to
store, within a pending transaction queue, transaction data for each of a plurality of pending transactions, wherein the transaction data for each of the plurality of pending transactions includes a transaction identifier (ID), an account ID of a source account from which assets are being debited, an account ID of a destination account to which the assets are being credited, and an indication of an amount of the assets being transferred from the source account to the destination account;
store, within the cache, a cache entry for each of a plurality of accounts,
wherein each cache entry includes an account ID, a running balance associated with the account ID, and a transaction ID of a last transaction that was used to calculate the running balance associated with the account ID; and
update two or more of the running balances included in respective two or more of the cache entries stored in the cache in response to one or more transactions from the pending transaction queue being processed and completed,
wherein the running balance included the cache entry for at least one of the plurality of accounts, which is stored in the cache, is calculated by reading a transaction from the pending transaction queue, determining whether a last transaction that was performed is the same as or differs from the transaction that was just read from the pending transaction queue, and updating the running balance included in the cache entry in response to determining that the last transaction that was performed differs from the transaction that was just read from the pending transaction queue, and
wherein when a said transaction that is processed and completed involves transferring a specified amount of assets from a first account to a second account, the running balance included in the cache entry for the first account is debited by the specified amount and the running balance included in the cache entry for the second account is credited by the specified amount, without data stored in the database for the first and second accounts being locked; and
store, within the database, data associated with each said transaction that has been processed and completed and resulted in assets being transferred from one of the accounts to another, so that the data stored in the database is available at a later time for analysis.

2. The computer system of claim 1, wherein the one or more processors is/are also configured to:
not complete a said transaction, for which transaction data was stored in the pending transaction queue, when the transaction data specifies that an amount of assets to be transferred from a source account to a destination account is less than the running balance included in the cache entry associated with the account ID of the source account; and
store, within the database, data associated with the said transaction that was not completed, so that the data associated with the said transaction that was not completed is available at a later time for analysis.

3. The computer system of claim 1, wherein the one or more processors is/are also configured to use the running balances included in the cache entries to determine whether or not to complete one or more additional pending transactions for which transaction data is stored in the pending transaction queue.

4. The computer system of claim 1, wherein the one or more processors are further configured to:
store, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs;
store, in a further cache, a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1;
extract one of the IDs from a transaction request that was processed and completed by at least one of the one or more processors of the computer system;
update a respective value of at least one of the n-elements included in the n-tuple value of the KVP stored in the further cache for the one of the IDs extracted from the transaction request that was processed and completed, to thereby update analytics associated with the one of the IDs without requiring that a query be run against the database; and
store, in the database, transaction data for the transaction request that was processed and completed so that the transaction data is available at a later time for further analytics to be performed for the one of the IDs, if desired, by running a query against the database.

5. The system of claim 4, wherein the one or more processors are further configured to:
extract a further one of the IDs from a further transaction request that was processed and not completed by at least one of the one or more processors of the computer system;
update a respective value of at least one of the n-elements included in the n-tuple value of the KVP stored in the further cache for the further one of the IDs extracted from the further transaction request that was processed and not completed, to thereby update analytics associated with the further one of the IDs without requiring that a query be run against the database; and
store, in the database, further transaction data for the further transaction request that was processed and not completed so that the further transaction data is available at a later time for further analytics to be performed for the further one of the IDs, if desired, by running a query against the database.

6. The system of claim 4, wherein:
each of the IDs for which analytics are to be tracked comprises an incentive ID associated with a campaign for which analytics are to be tracked;
the further cache comprises an incentive ID cache;

the KVPs stored in the incentive ID cache enable analytics associated with the campaign to be updated in real or near-real time without requiring that a query be run against the database;

the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

7. A computer system, comprising:

one or more processors;

memory within which a cache is stored; and a database;

the one or more processors configured to store, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs;

store, in the cache, a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1;

extract one of the IDs from a transaction request that was processed and completed by at least one of the one or more processors of the computer system;

update a respective value of at least one of the n-elements included in the n-tuple value of the KVP stored in the cache for the one of the IDs extracted from the transaction request that was processed and completed, to thereby update analytics associated with the one of the IDs without requiring that a query be run against the database; and store, in the database, transaction data for the transaction request that was processed and completed so that the transaction data is available at a later time for further analytics to be performed for the one of the IDs, if desired, by running a query against the database;

wherein the transaction request that was processed and completed was issued in response to one of a plurality of predetermined actions being performed by an entity associated with an account, wherein each of the predetermined actions has a respective weight for each of a plurality of categories, and wherein the one or more processors are further configured to:

calculate a behavior score for the entity that performed the one of the plurality of predetermined actions by producing a vector of weights, with each of the weights being associated with a different one of the categories; and adjust which or to what extent specific ones of the actions are incentivized based on the calculated behavior score.

8. The system of claim 7, wherein the one or more processors are further configured to:

calculate a respective behavior score for each of the plurality of the categories by calculating a respective a weighted average of a plurality of actions performed by a plurality of entities over each of the categories; and adjust one or more campaigns based on results of the calculating the behavior scores for the plurality of categories.

9. A computer system, comprising:

one or more processors;

memory within which a cache is stored; and a database;

the one or more processors configured to store, in the database, data for each of a plurality of transactions such that the data is thereafter accessible by running queries against the database, wherein each of the transactions is associated with one of a plurality of identifier (IDs) for which analytics are to be tracked, and wherein multiple ones of the transactions can be associated with a same one of the IDs;

store, in the cache, a plurality of key-value pairs (KVPs), wherein each KVP of the plurality of KVPs includes a key that comprises a different one of the IDs and an n-tuple value that comprises a list of n-elements for which analytics are to be tracked for the ID, where n is positive integer that is greater than 1;

extract one of the IDs from a transaction request that was processed and completed by at least one of the one or more processors of the computer system;

update a respective value of at least one of the n-elements included in the n-tuple value of the KVP stored in the cache for the one of the IDs extracted from the transaction request that was processed and completed, to thereby update analytics associated with the one of the IDs without requiring that a query be run against the database;

store, in the database, transaction data for the transaction request that was processed and completed so that the transaction data is available at a later time for further analytics to be performed for the one of the IDs, if desired, by running a query against the database;

extract a further one of the IDs from a further transaction request that was processed and not completed by at least one of the one or more processors of the computer system;

update a respective value of at least one of the n-elements included in the n-tuple value of the KVP stored in the cache for the further one of the IDs extracted from the further transaction request that was processed and not completed, to thereby update analytics associated with the further one of the IDs without requiring that a query be run against the database; and store, in the database, further transaction data for the further transaction request that was processed and not completed so that the further transaction data is available at a later time for further analytics to be performed for the further one of the IDs, if desired, by running a query against the database;

wherein each of the IDs for which analytics are to be tracked comprises an incentive ID associated with a campaign for which analytics are to be tracked; and wherein the cache comprises an incentive ID cache.

10. The system of claim 9, wherein:

the KVPs stored in the incentive ID cache enable analytics associated with the campaign to be updated in real or near-real time without requiring that a query be run against the database;

the transaction request that was processed and completed by at least one of the one or more processors of the computer system caused a transfer of one or more assets from a first entity to a second entity; and the further transaction request that was processed and not completed by at least one of the one or more processors of the computer system did not cause a transfer of one or more assets.

11. The system of claim 10, wherein the transaction request that was processed and completed was issued in response to one of a plurality of predetermined actions being performed by an entity associated with an account, wherein each of the predetermined actions has a respective weight for each of a plurality of categories, and wherein the one or more processors are further configured to:
calculate a behavior score for the entity that performed the one of the plurality of predetermined actions by producing a vector of weights, with each of the weights being associated with a different one of the categories.

12. The system of claim 11, wherein the one or more processors are further configured to:
adjust which or to what extent specific ones of the actions are incentivized based on the calculated behavior score.

13. The system of claim 10, wherein the one or more processors is/are further configured to:
calculate a respective behavior score for each of the plurality of the categories by calculating a respective a weighted average of a plurality of actions performed by a plurality of entities over each of the categories.

14. The system of claim 13, wherein the one or more processors is/are further configured to:
adjust one or more campaigns based on results of the calculating the behavior scores for the plurality of categories.

15. A computer system, comprising:
one or more processors; and
a data store;
the one or more processors configured to
store, within the data store, data that defines an asset pool, actions that trigger respective transactions request, and deadlines by which the actions are to be performed to trigger the respective transaction requests;
monitor for performance of the actions;
issue a respective transaction request to transfer one or more assets from the asset pool to an account of the end user that performed the one of the actions, in response to receiving an indication that one of the actions has been performed by an end user within the respective deadline;
process and complete a transaction corresponding to the transaction request including debiting the asset pool and crediting the account of the end user that performed the one of the actions;

update a behavior score of at least the end user that performed the one of the actions, following the processing and completing of the transaction;
modify the data that defines the asset pool and one or more of the actions that trigger respective transaction requests, following the processing and completing of the transaction;
store, within the data store, data that defines when a transferred asset, from the asset pool, is a vested asset or a conditional asset; and
after a conditional asset has been transferred to the account of the end user,
monitor for performance of a specific one of the actions that if performed by the end user by a respective deadline, would cause that conditional asset to be converted to a vested asset, and
provide a notification to a client device of the end user that warns the end user of the deadline and that the conditional asset will be transferred back to the asset pool if the specific one of the actions is not performed by the deadline, prior to the respective deadline for the specific one of the actions; and
transfer the conditional asset from the account of the end user back to the asset pool, in response to a determination that the specific one of the actions was not performed by the respective deadline.

16. The computer system of claim 1, wherein:
the cache entry for at least one of the plurality of accounts, which is stored in the cache, is updated by the one or more processors reading the respective running balance for the cache entry, querying transactions that occurred after the last cached transaction that was performed, and updating the running balance for the cache entry based on the queried transactions that occurred after the last cached transaction that was performed.

17. The computer system of claim 1, wherein:
the transaction data for each of the plurality of pending transactions, which is stored within the pending transaction queue, includes metadata indicating whether the assets being transferred are conditional or vested assets; and
for each of the plurality of pending transactions for which the respective metadata indicates that the assets being transferred are conditional assets, the one or more processors is/are also configured to monitor for performance of a specific action that if performed by a respective deadline would cause the conditional assets to be converted to vested assets, and if not performed by the respective deadline would cause transfer the conditional assets from a said destination account back to a said source account.

* * * * *